United States Patent
Speight et al.

(10) Patent No.: US 8,934,400 B2
(45) Date of Patent: Jan. 13, 2015

(54) APPARATUS AND METHODS FOR RELAY-ASSISTED UPLINK COMMUNICATION

(71) Applicant: General Dynamics C4 Systems, Inc., Scottsdale, AZ (US)

(72) Inventors: Timothy Speight, Bristol (GB); Paul Piggin, Wiltshire (GB)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 168 days.

(21) Appl. No.: 13/774,368

(22) Filed: Feb. 22, 2013

(65) Prior Publication Data
US 2014/0241236 A1    Aug. 28, 2014

(51) Int. Cl.
| | | |
|---|---|---|
| *H04B 7/14* | (2006.01) | |
| *H04W 88/04* | (2009.01) | |
| *H04W 74/08* | (2009.01) | |
| *H04B 7/155* | (2006.01) | |
| *H04W 52/10* | (2009.01) | |
| *H04W 52/18* | (2009.01) | |
| *H04W 52/46* | (2009.01) | |

(Continued)

(52) U.S. Cl.
CPC .......... *H04W 88/04* (2013.01); *H04W 74/0833* (2013.01); *H04B 7/15535* (2013.01); *H04W 52/10* (2013.01); *H04W 52/18* (2013.01); *H04W 52/46* (2013.01); *H04W 56/0045* (2013.01); *H04W 84/047* (2013.01)
USPC .............................................. 370/315; 455/7

(58) Field of Classification Search
None
See application file for complete search history.

(56) References Cited

U.S. PATENT DOCUMENTS

| | | | | |
|---|---|---|---|---|
| 7,599,341 | B2 * | 10/2009 | Ramachandran | 370/338 |
| 8,126,034 | B2 * | 2/2012 | Lee et al. | 375/213 |
| 8,155,016 | B2 * | 4/2012 | Zhang et al. | 370/252 |

(Continued)

FOREIGN PATENT DOCUMENTS

GB    2493782 A    2/2013

OTHER PUBLICATIONS

Technical Specification—3rd Generation Partnership Project; Technical Specification Group Radio Access Network; Evolved Universal Terrestrial Radio Access (E-UTRA); Physical layer procedures (Release 10); 3GPP TS 36.213 V10.5.0 (Mar. 2012); 25 Pages.

(Continued)

*Primary Examiner* — Brian Roberts
(74) *Attorney, Agent, or Firm* — Fitch Even Tabin & Flannery LLP

(57) ABSTRACT

A terminal device is arranged to communicate with a base station via a relay device in a wireless communications system. The terminal device comprises: a transmitter arranged to transmit a first access request message to the base station wherein the access request message comprises one from a set of access preambles that indicate relay device uplink assistance is required; a receiver arranged to receive an access request grant response from the base station; and a control processor operably coupled to the transmitter and receiver and arranged to: process the access request grant response; extract transmit power control information therefrom for transmissions to the relay device; map a first power level indicated in the transmit power control information to a second power level associated with a transmission via the relay device; and generate and transmit a transmission to the relay device at the mapped transmit second power level.

19 Claims, 15 Drawing Sheets

(51) Int. Cl.
*H04W 56/00* (2009.01)
*H04W 84/04* (2009.01)

(56) References Cited

U.S. PATENT DOCUMENTS

| | | | |
|---|---|---|---|
| 8,588,840 B2* | 11/2013 | Truong et al. | 455/522 |
| 2006/0141929 A1* | 6/2006 | Lockie et al. | 455/11.1 |
| 2009/0053994 A1* | 2/2009 | Senarath et al. | 455/11.1 |
| 2010/0022184 A1* | 1/2010 | Khoshnevis et al. | 455/7 |
| 2010/0067417 A1* | 3/2010 | Zhou et al. | 370/311 |
| 2010/0093386 A1 | 4/2010 | Damnjanovic et al. | |
| 2011/0159802 A1* | 6/2011 | Binti Harum et al. | 455/7 |
| 2012/0281658 A1* | 11/2012 | Rikkinen et al. | 370/329 |

OTHER PUBLICATIONS

Technical Specification—3rd Generation Partnership Project; Technical Specification Group Radio Access Network; Evolved Universal Terrestrial Radio Access (E-UTRA); Medium Access Control (MAC) protocol specification (Release 10); 3GPP TS 36.321 V10.5.0 (Mar. 2012); 54 Pages.

Technical Specification—3rd Generation Partnership Project; Technical Specification Group Radio Access Network; Evolved Universal Terrestrial Radio Access (E-UTRA); Radio Resource Control (RRC); Protocol specification (Release 10); 3GPP TS 36.331 V10.5.0 (Mar. 2012); 302 Pages.

Extended European Search Report from European Patent Application No. 14153752.2-1857; Dated: Jun. 20, 2014.

* cited by examiner

APPARATUS AND METHODS FOR RELAY-ASSISTED UPLINK COMMUNICATION

FIELD OF THE INVENTION

The field of this invention relates to methods and apparatus for relay-assisted uplink communication.

BACKGROUND OF THE INVENTION

A recent development in third generation (3G) wireless communications is the long term evolution (LTE) cellular communication standard, sometimes referred to as $4^{th}$ generation (4G) systems. Both of these technologies are compliant with third generation partnership project (3GPP™) standards. It is anticipated that 4G systems will be deployed in existing spectral allocations owned by Network Operators and new spectral allocations that are yet to be licensed. Irrespective of whether these LTE spectral allocations use existing second generation (2G) or 3G allocations being re-farmed for fourth generation (4G) systems, or new spectral allocations for existing mobile communications, they will be primarily paired spectrum for frequency division duplex (FDD) operation.

In addition to the large number of standard wireless subscriber communication units that employ the above technologies, there is an increasing number of other communication devices that may usefully connect to current mobile telecommunication networks. Examples include so-called machine type communication (MTC) devices, which are typified by semi-autonomous or autonomous wireless communication units that are designed to communicate small amounts of data on a relatively infrequent basis. Examples of MTC devices include so-called smart meters, which, for example, may be located in a customer's house and periodically transmit information back to a central MTC server data relating to the customers consumption of a utility such as gas, water, electricity, and so on. Thus, a large number of MTC devices are expected to support very low power consumption and with small, intermittent data transmissions.

It is also known that 'uplink-only relaying' is a network topology that may be used to address the issue of achieving low transmit power in low-cost MTC devices, for instance, in macro cellular LTE networks. In general, in relay-node applications, there is typically sufficient system gain on the downlink (base station to subscriber communication unit or terminal device) to support MTC devices (or User Equipment UE) (MTC-UE) at the cell edge of the macrocell of the eNodeB (eNB). However, with the low output power of the MTC devices the uplink (terminal device to base station) system gain is significantly reduced compared with the downlink. The use of a single hop uplink-only relay device (MTC-RN) can be used to address this issue and close the link budget for MTC-UE. A single hop may be assumed, provided that the MTC-RN can be expected to have similar characteristics to an LTE UE. In a network where relay devices (also referred to herein as relay devices) are utilised to relay uplink data from the terminal devices to the eNodeB, the eNodeB may be referred to as a donor eNodeB (DeNB).

FIG. 1 illustrates a simplified schematic of an uplink-only single-hop relay communication system 100, comprising base station (such as eNodeB) 105, carrier network 110, relay device 115 and user equipment (UE) 120. In this simplified schematic, eNodeB 105 communicates with other eNodeBs (not shown) via the carrier network 110. Communication system 100 comprises an asymmetric uplink/downlink arrangement, whereby wireless downlink communications between the base station 105 and UE 120 have a direct communication path 125, but are single-hopped for the uplink communication path 130 from UE 120 to base station 105 via relay device 115. The base station 110 may also transmit control signalling on a separate downlink path 135 to relay device 115 in order to control the operation of the relay device 115.

The configuration of FIG. 1 allows lower power transmissions to be sent from the UE 120, for example where the lower power is sufficient for the MTC device's lower transmit power to be able to reach the relay device's receiver at a decodeable power level, whereas the MTC device's lower transmit power would not be able to reach the eNodeB's receiver at a decodeable power level. However, the disadvantage with this system is that the transmission time from the UE 120 to the base station 110 has been increased due to the implementation of relay device 115. Further, there is no transmission from the relay device 115 to the UE 120. Therefore, a potential problem with uplink-only relaying is that the relay device is unable to feed back control information to the MTC device to support efficient future transmissions between the MTC device and the base station via the relay device, for example to control the power of such transmissions to avoid interference with other users.

Therefore there is a need for a terminal device and a base station supporting an uplink-only relaying system to be able to better control communications between the terminal device, such as an MTC device, and the base station, such as an eNodeB.

SUMMARY OF THE INVENTION

The present invention provides communication units and methods of operation at such communication units in a communication system that supports a terminal device communicating with a base station via a relay device, as described in the accompanying claims. Specific embodiments of the invention are set forth in the dependent claims. These and other aspects of the invention will be apparent from and elucidated with reference to the embodiments described hereinafter.

DETAILED DESCRIPTION

Figure 1:
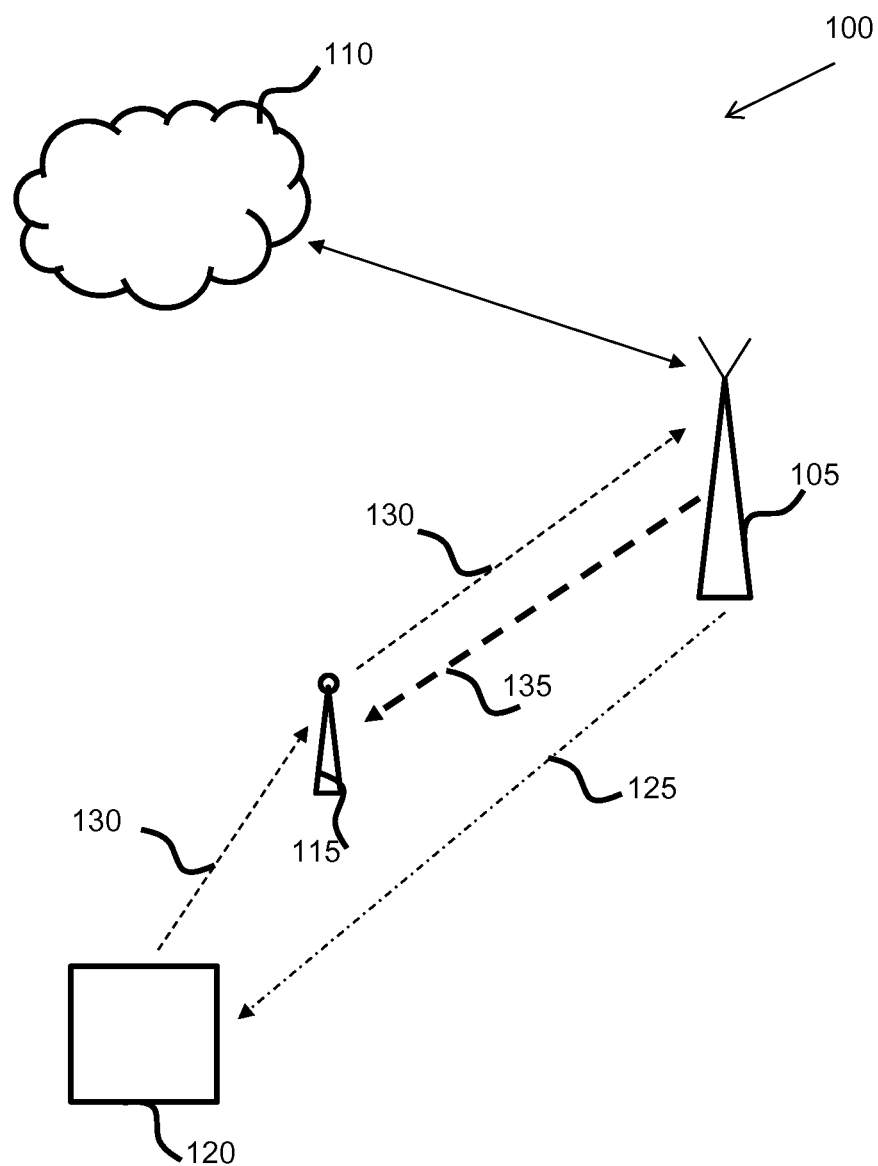
FIG. 1 illustrates a simplified schematic of an uplink-only single-hop communications system.
Figure 2:
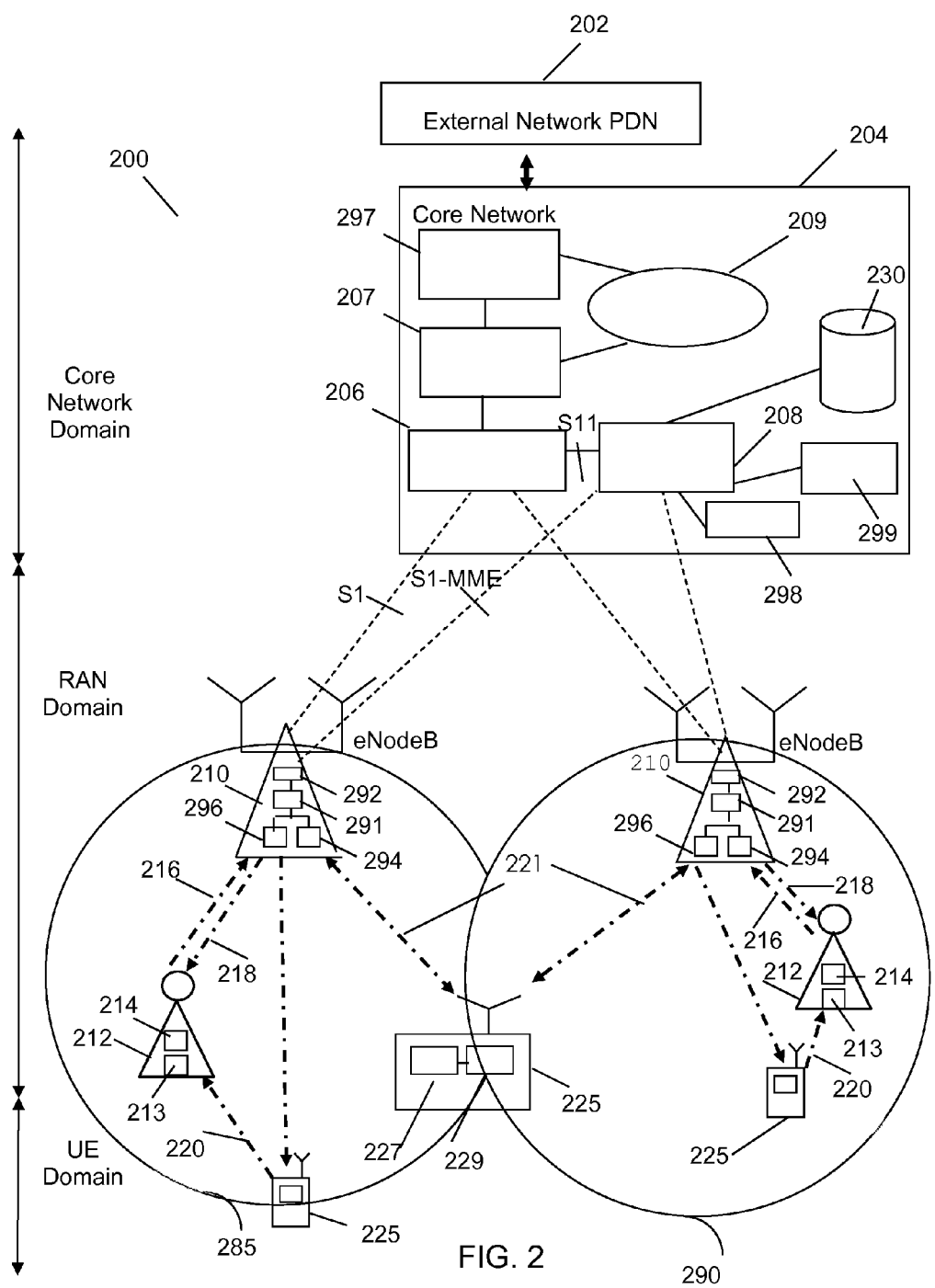
FIG. 2 illustrates a 3GPP™ LTE cellular communication system adapted in accordance with some example embodiments of the present invention.

Referring now to FIG. 2, a wireless communication system 200 is shown in outline, in accordance with one example embodiment of the invention. In this example embodiment, the wireless communication system 200 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 200 architecture consists of radio access network (RAN) and core network (CN) elements 204, with the core network elements 204 being coupled to external networks 202 (named Packet Data Networks (PDNs)), such as the Internet or a corporate network. The CN elements 204 comprise a packet data network gateway (P-GW) 207. In order to serve up local content, the P-GW may be coupled to a content provider 209. The P-GW 207 may be further coupled to a policy control and rules function entity (PCRF) 297 and a Gateway 206.

The PCRF 297 is operable to control policy control decision making, as well as for controlling the flow-based charging functionalities in a policy control enforcement function PCEF (not shown) that may reside in the P-GW 207. The PCRF 297 may further provide a quality of service (QoS) authorisation class identifier and bit rate information that dictates how a certain data flow will be treated in the PCEF, and ensures that this is in accordance with a UE's 225 subscription profile.

In example embodiments, the Gateway 206 may be a Serving Gateway (S-GW). The Gateway 206 is coupled to a mobility management entity MME 208 via an S11 interface.

The MME 208 is operable to manage session control of Gateway bearers and is operably coupled to a home subscriber service (HSS) database 230 that is arranged to store subscriber communication unit 225 (user equipment (UE)) related information. As illustrated, the MME 208 also has a direct connection to each eNodeB 210, via an S1-MME interface.

The HSS database 230 may store UE subscription data such as QoS profiles and any access restrictions for roaming. The HSS database 230 may also store information relating to the P-GW 207 to which a UE 225 can connect. For example, this data may be in the form of an access point name (APN) or a packet data network (PDN) address. In addition, the HSS database 230 may hold dynamic information relating to the identity of the MME 208 to which a UE 225 is currently connected or registered.

The MME 208 may be further operable to control protocols running between the user equipment (UE) 225 and the CN elements 204, which are commonly known as Non-Access Stratum (NAS) protocols. The MME 208 may support at least the following functions that can be classified as functions relating to bearer management (which may include the establishment, maintenance and release of bearers), functions relating to connection management (which may include the establishment of the connection and security between the network and the UE 225) and functions relating to inter-working with other networks (which may include the handover of voice calls to legacy networks). The Gateway 206 predominantly acts as a mobility anchor point and is capable of providing internet protocol (IP) multicast distribution of user plane data to eNodeBs 210. The Gateway 206 may receive content via the P-GW 207 from one or more content providers 209 or via the external PDN 202. The MME 208 may be further coupled to an evolved serving mobile location center (E-SMLC) 298 and a gateway mobile location center (GMLC) 299.

The E-SMLC 298 is operable to manage the overall coordination and scheduling of resources required to find the location of the UE that is attached to the RAN, in this example embodiment the E-UTRAN. The GMLC 299 contains functionalities required to support location services (LCS). After performing an authorisation, it sends positioning requests to the MME 208 and receives final location estimates.

The P-GW 207 is operable to determine IP address allocation for a UE 225, as well as QoS enforcement and flow-based charging according to rules received from the PCRF 297. The P-GW 207 is further operable to control the filtering of downlink user IP packets into different QoS-based bearers (not shown). The P-GW 207 may also serve as a mobility anchor for inter-working with non-3GPP technologies such as CDMA2000 and WiMAX networks.

If the Gateway 206 comprises an S-GW, the eNodeBs 210 would be connected to the S-GW 206 and the MME 208 directly. In this case, all UE packets would be transferred through the S-GW 206, which may serve as a local mobility anchor for the data bearers when a UE 225 moves between eNodeBs 210. The S-GW 206 is also capable of retaining information about the bearers when the UE 225 is in an idle state (known as EPS connection management IDLE), and temporarily buffers downlink data while the MME 208 initiates paging of the UE 225 to re-establish the bearers. In addition, the S-GW 206 may perform some administrative functions in the visited network, such as collecting information for charging (i.e. the volume of data sent or received from the UE 225). The S-GW 206 may further serve as a mobility anchor for inter-working with other 3GPP™ technologies such as GPRS™ and UMTS™.

As illustrated, the CN 204 is operably connected to two eNodeBs 210, with their respective coverage zones or cells 285, 290 and a plurality of UEs 225 receiving transmissions from the CN 204 via the eNodeBs 210. In accordance with example embodiments of the present invention, at least one eNodeB 210 and at least one UE 225 (amongst other elements) have been adapted to support the concepts hereinafter described.

The main component of the RAN is an eNodeB (an evolved NodeB) 210, which performs many standard base station functions and is connected to the CN 204 via an S1 interface and to the UEs 225 via a Uu interface. A wireless communication system will typically have a large number of such infrastructure elements where, for clarity purposes, only a limited number are shown in FIG. 2. The eNodeBs 210 control and manage the radio resource related functions for a plurality of wireless subscriber communication units/terminals (or user equipment (UE) 225 in UMTS™ nomenclature).

Each of the UEs 225 comprise a transceiver unit 227 operably coupled to control processing logic 229 (with one UE illustrated in such detail for clarity purposes only). The system comprises many other UEs 225 and eNodeBs 210, which for clarity purposes are not shown.

As illustrated, each eNodeB 210 comprises one or more wireless transceiver (transmitter and/or receiver) unit(s) 294 that is/are operably coupled to a control processor 296 and memory 292 for storing, inter alia, information relating to UEs and UE capabilities, for example whether the UE is able to or may be required to operate in an extended coverage mode via a relay device. Each eNodeB 210 further comprises a scheduler 291, which may be operably coupled to the one or more wireless transceiver unit(s) 294, the control processor 296 and memory 292.

In example embodiments of the present invention, a control processor of a network element, such as control processor 296 of eNodeB 210, is arranged to transmit a signal to a wireless communication unit, such as UE 225, and receive communications back from the UE, either direct or via a relay device.

Further, as illustrated, in some instances UEs 225 may be served by relay devices 212. In this example embodiment, relay devices 212 are asynchronous relay devices, allowing information to, at least, be relayed from UEs 225 to eNodeBs 210, without necessarily providing the reverse communication link of forwarding communication from the eNodeBs 210 to the UEs 225. In part, this relay device asynchronous mode of operation is a result of the transmit power and receiver sensitivity of the eNodeBs 210 being greater than the transmit power and receiver sensitivity of the UEs 225. In this manner, the eNodeBs may transmit signals on the downlink (DL) path to the UEs 225 located at the edge of its communication coverage direct, whereas the UE's transmit power may be insufficient to achieve the corresponding uplink (UL) communication to the eNodeB.

Here, the asynchronous relay device 212 assists (i.e. relays) the UL communication from the UE 225 to the corresponding eNodeB 210. In this example embodiment, relay devices 212 comprise, at least, control processor 213 operably coupled to a transceiver (not shown) and a memory device 214. In some examples, the control processor 213 may be located on an integrated circuit (not shown). In example embodiments, relay device 212 is configured to receive a wireless communication signal 220 from UE 225 and selectively relay this wireless communication signal 216 to eNodeB 210. In some instances, relay device 212 may receive wireless communication signals 218 from eNodeB 210. In some example embodiments, relay devices 212 may modify a received wireless communication signal 220 before relaying 216 to eNodeB 210. In other example embodiments, relay devices 212 may be controlled via eNodeB 210 via, say, wireless communication signal 218. In yet further example embodiments, relay devices 212 may be operable to determine information independently of eNodeB 210.

In some examples of the invention, a base station (such as eNodeB 210) is arranged to communicate with a terminal device (such as UE 225) on an uplink channel via a relay device 212 in a wireless communications system. The base station comprises: a receiver arranged to receive an access request message from the terminal device; and a control processor operably coupled to the receiver and arranged to: process the access request message; extract a relayed control element that indicates relay device uplink assistance was used wherein the relayed control element comprises a power delta from the relay device; and construct and transmit an access request grant response to the terminal device comprising a mapped transmit power value to be applied by the terminal device in relayed communications.

Clearly, the various components within the eNodeB 210, UE 225 and/or relay device 212 can be realized in discrete or integrated component form, with an ultimate structure therefore being an application-specific or design selection. Further, although example embodiments of the invention have been described with reference to an evolved NodeB (eNodeB), UE 225 and relay device 212, it should be apparent to a skilled person that example embodiments of the invention could be utilised with any base station (or other network element), terminal device or communication relay device.

Figure 3:
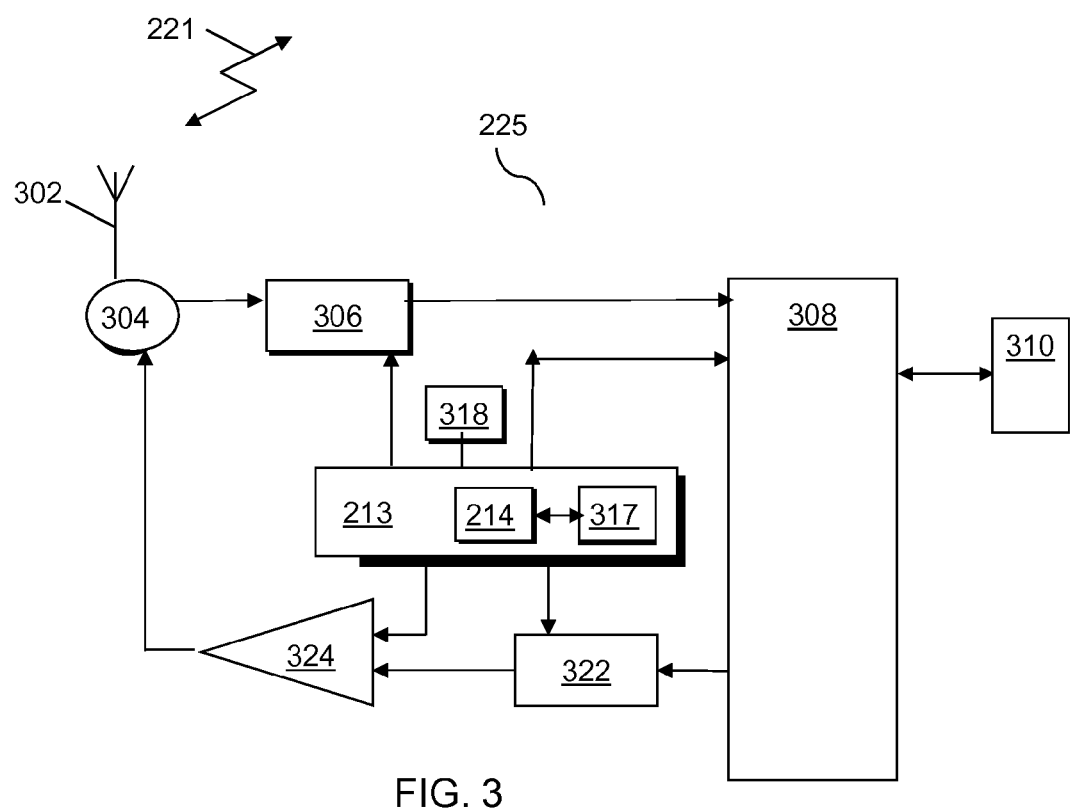
FIG. 3 illustrates an example block diagram of a terminal device, such as a 3GPP™ LTE user equipment adapted in accordance with some example embodiments of the present invention.

Referring now to FIG. 3, a block diagram of a terminal device, such as UE 225 of FIG. 2 is shown, adapted in accordance with some example embodiments of the invention. The UE 225 contains an antenna 302 coupled to antenna switch 304 that provides isolation between receive and transmit chains within the UE 225. One or more receiver chains, as known in the art, include receiver front-end circuitry 306 (effectively providing reception, filtering and intermediate or base-band frequency conversion). The receiver front-end circuitry 306 is coupled to a user interface 310, such as a display, touch screen or keypad via a signal processing module 308 (generally realised by a digital signal processor (DSP)). A skilled artisan will appreciate that the level of integration of using receiver circuits or components may be, in some instances, implementation-dependent.

The control processor 213 maintains overall operational control of the UE 225. The control processor 213 is also coupled to the receiver front-end circuitry 306 and the signal processing module 308. In some examples, the control processor 213 is also coupled to a buffer module 317 and a memory device 214 that selectively stores operating regimes, such as decoding/encoding functions, synchronization patterns, code sequences, and the like. A timer 318 is operably coupled to the control processor 213 to control the timing of operations (transmission or reception of time-dependent signals) within the UE 225.

As regards the transmit chain, this essentially includes transmitter/modulation circuitry 322 and a power amplifier 324 operably coupled to the antenna, antenna array 302, or plurality of antennae. The transmitter/modulation circuitry 322 and the power amplifier 324 are operationally responsive to the control processor 213.

In some examples of the invention, a terminal device (such as UE 225), for wirelessly communicating data to a base station (such as eNodeB 210) via a relay device 212 comprises: a transmitter arranged to transmit an access request message to the base station wherein the access request message comprises one from a set of access preambles that indicate relay device uplink assistance is required, a receiver arranged to receive an access request grant response from the base station, and a control processor 213 arranged to process the access request grant response; extract transmit power control information therefrom for transmissions to the relay device; map a first power level indicated in the transmit power control information to a second power level associated with a transmission via the relay device; and generate and transmit a transmission to the relay device at the mapped transmit second power level.

The control processor 213 and/or signal processor module 308 in the transmit chain may be implemented as distinct from the signal processor in the receive chain. Alternatively, a single processor may be used to implement a processing of both transmit and receive signals, as shown in FIG. 3. Clearly, the various components within the UE 225 can be realized in discrete or integrated component form, with an ultimate structure therefore being an application-specific or design selection.

As discussed above, a potential issue with an asynchronous relay-assisted uplink is that the relay device is unable to communicate directly with the UE 225. An example of a possible problem with the above topology is illustrated in FIG. 4.

Figure 4:
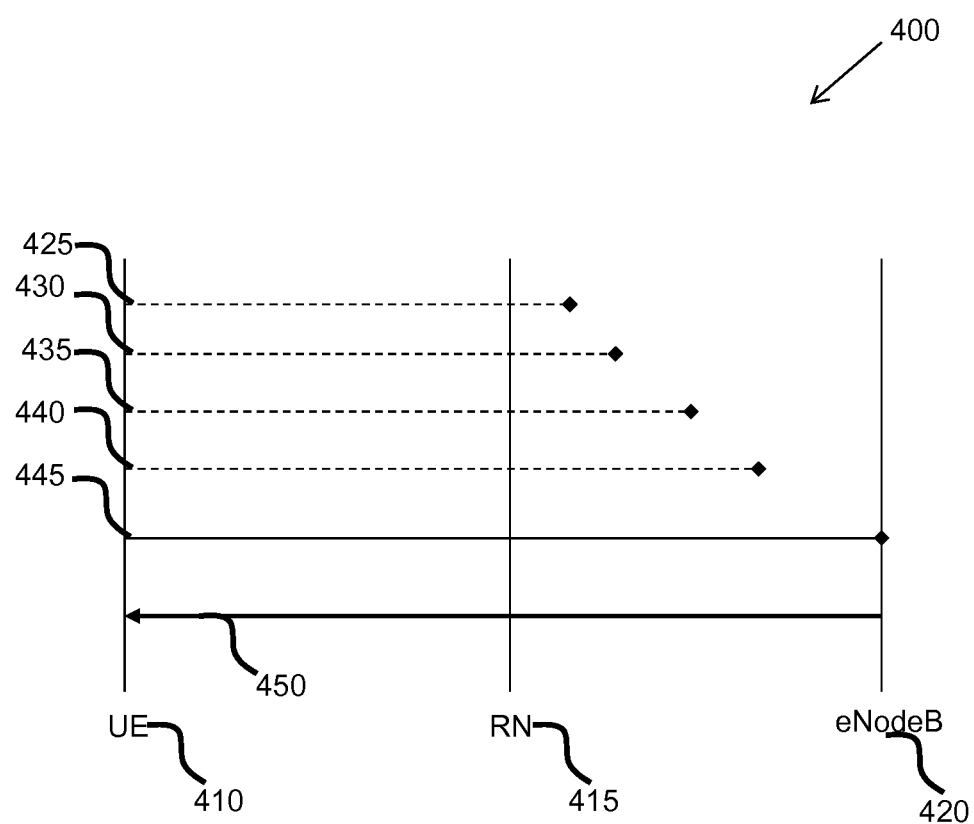
FIG. 4 illustrates a simplified block diagram of random access preamble transmission.

FIG. 4 illustrates an example access sequence diagram 400 of a UE 410 transmitting a series of preambles on a random access channel (RACH) to a base station at progressively higher power levels (i.e. the UE operating in a power ramping mode). In general, the UE 410 randomly selects a random access preamble from a group of predetermined random access preambles available to it. The preamble is transmitted on a next available Physical Random Access Channel (PRACH) resource available to the UE 410. The position (in time and frequency resource) of the transmitted random access preamble implicitly provides a temporary identifier, e.g. Random Access Radio Network Temporary Identifier (RA-RNTI), for the transmitting UE 410.

If the random access preamble is received at the base station (such as eNodeB 420), a random access response is transmitted from the eNodeB 420 to the UE 410. The random access response is transmitted on the physical downlink shared channel (PDSCH), with the UE 410 being informed via an indication on the physical downlink control channel (PDCCH) of the downlink resources on which the random access response is to be carried. In particular, the PDCCH has its cyclic redundancy check (CRC) bits scrambled using the RA-RNTI (as derived from the time and frequency resources utilised to transmit the random access preamble), and also indicates a resource block assignment (time and frequency resources) on the PDSCH that will carry the random access response.

The UE 410 recognises that the random access response is intended for it by means of the CRC bits being scrambled by its RA-RNTI, and looks at the assigned resource block in the PDSCH. The RAR also contains a random access preamble identifier (RAPID), which is based on the actual preamble used by the UE. This provides a further mechanism for the UE to be able to identify the appropriate response (in addition to the RA-RNTI, based on time/frequency of the transmitted preamble). In response to the random access response, the UE 410 transmits a message-3 radio resource control (RRC) Connection Request Message to the eNodeB 420. The message-3 is transmitted on physical uplink shared channel (PUSCH) resources allocated by the random access response. Once the RAR is received, the RAPID indication may be used to distinguish between multiple UEs that make preamble attempts.

In response to the message-3, the eNodeB 420 sends certain information to the UE 410 for contention resolution purposes. This information is transmitted on the PDSCH (again on resources allocated by the PDCCH using the temporary C-RNTI allocated in the RAR to address the UE, which become the UEs permanent identifier if contention resolution is successful). The contention resolution information is contained within a UE Contention Resolution Identity control element. If the UE Contention Resolution Identity received at the terminal device/UE 410 from the eNodeB 420 matches a CCCH (Common Control Channel) SDU (Service Data Unit) transmitted in the message-3, then the UE 410 considers that contention resolution has been successful and that the random access procedure has been successfully completed.

The reason for providing contention resolution is that more than one UE/terminal device may attempt to access the network using the same random access preamble on the same time and frequency resource. The CCCH SDUs transmitted by the contending UEs/terminal devices can be expected to be different, and therefore UEs can determine if their random access response is successful by comparing their transmitted CCH SDU with the one returned to them by the eNodeB 420 in the contention resolution identity medium access control (MAC) layer control element. This contention resolution operation may be applied to all relevant example embodiments of the invention.

If a random access response/acknowledgement is not received by the UE 410, it knows that the base station/eNodeB 420 did not receive the UE's transmission and, thus, one or more successive random access preamble is sent, in this example, with a different, higher power level.

As shown, in a relay assisted context, relay device (RN) 415 is located closer to the UE 410 than the intended recipient eNodeB 420 and is thus potentially able to assist the UE 410 in accessing the core network, should the UE 410 be located too far away from the base station/eNodeB 420.

The simplified example diagram of random access preamble transmissions 400, comprises a number of failed RACH preamble transmissions 425, 430, 435, 440, a successful RACH preamble transmission 445 and a RACH response 450. As shown, the UE 410 transmits a succession of random access preambles 425, 430, 435 and 440 utilising a power ramping regime, until the transmit power is hopefully strong enough to enable a RACH preamble 445 to be detected by the eNodeB 420. Each RACH preamble transmission is randomly selected by the UE 410. As shown, the UE 410 is located too far away from the base station/eNodeB 420 and therefore each of the RACH preambles 425, 430, 435, 440 is received by the relay device 415, but not by the eNodeB 420.

The relay device 415 is able to identify failed transmissions by noting the received RACH preambles that do not have a corresponding RACH response from eNodeB 420, for example using the Random Access Radio Network Temporary Identifier (RA-RNTI). However, the relay device 415 does not know that the failed RACH preambles have been transmitted from the same UE 410, since each selected RACH preamble is randomly selected by the UE 410. Therefore the relay device 415 does not, in this explanatory diagram 400, know which UE 410 to assist with a RACH request (should a plurality of UEs be concurrently transmitting RACH requests).

In the case of the successfully transmitted and received RACH preamble 445, the relay device 415 is able to receive a corresponding RACH response 450 from the eNodeB 420, signalling that the relay device 415 is not required for further use by the UE 410, as an intermediary/relaying communication unit.

However, in this illustrated diagram, the relay device 415 is unable to relate any successful RACH preamble 445 with the failed RACH preambles 425, 430, 435 and 440 to identify that it is not required to assist the failed preambles, and, in the view of the relay device 415, there may still be UEs within its vicinity that require assistance to communicate with the core network. As each subsequent preamble re-transmission by the UE 410 uses a completely new randomly selected RACH preamble, it is almost impossible for the relay device 415 to determine whether two subsequent preamble re-transmissions have originated from the same UE 410.

Figure 5:
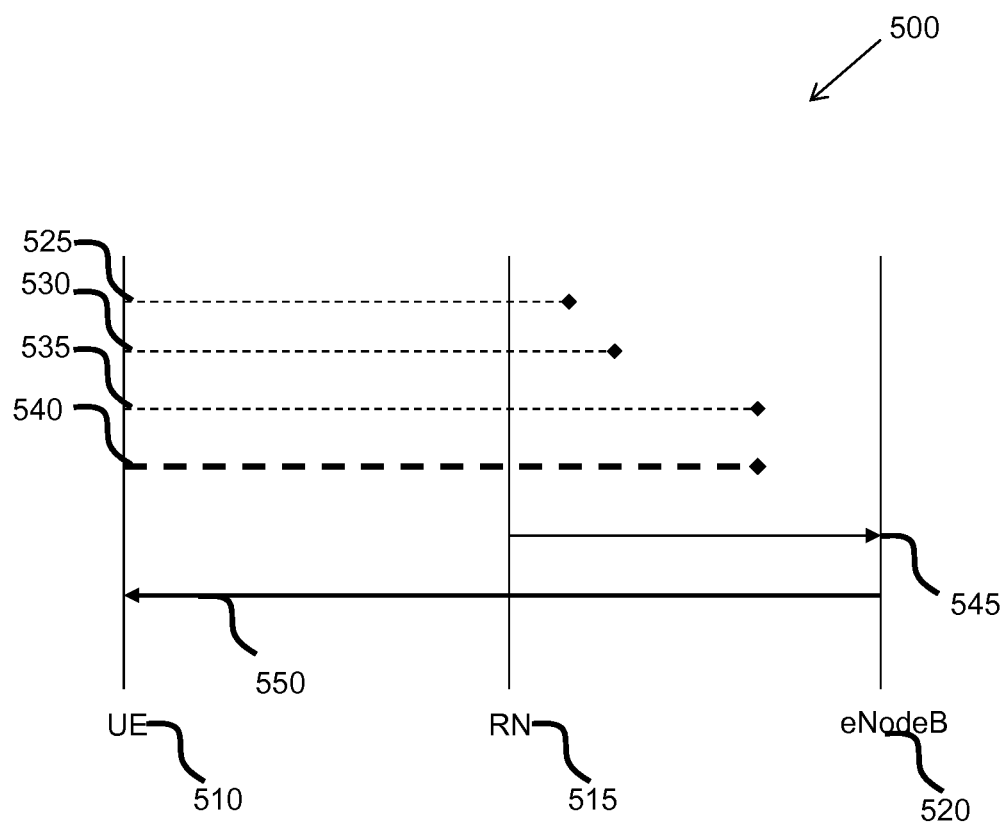
FIG. 5 illustrates a simplified block diagram of a modified random access preamble transmission.

FIG. 5 illustrates a simplified block diagram 500 of a modified random access preamble transmission according to example embodiments of the invention. The initial operation of this illustrated example is similar to that of FIG. 4, except that when the UE 510 reaches its maximum transmit power in the power ramping mode of random access preambles 525, 530, 535, and there has not been a corresponding RACH response from the eNodeB 520, a special group of RACH preambles 540 is utilised instead of the current group.

Transmitting the special group of RACH preambles 540 at the same power (for example at a maximum power) as the previous failed RACH preamble 535 allows the relay device (relay node (RN)) 515 to determine that the originating UE 510 has failed to connect directly to the eNodeB 520. In this case, the relay device 515 then relays 545 the implied information contained in the random access preamble in a special MAC message. The eNodeB 520 then transmits a corresponding RACH response 550 to the UE 510.

In some instances, it is preferable for the UE 510 to transmit the special group of RACH preambles 540 at maximum power as it at least guarantees that a connection can be made between the UE 510 and the relay device 515 quickly, in view of the fact that there may already have been an access delay due to the power ramping of the previous random access preambles 525, 530, 535. However, it may also be that the UE 510 is just out of coverage range of the eNodeB 520 to be able to successfully transmit to the eNodeB 520, whereas it may actually be located very close to the relay device 515.

This maximum transmit power transmission may be too high for the relay device 515 to successfully receive the special group of RACH preambles 540, if for example, the UE 510 is very close to the relay device 515. Therefore, a potential problem with the aforementioned approach may be that the relay node receiver is de-sensitized by the UE 510 transmitting the special group of RACH preambles 540 at maximum power. In this example embodiment, the relay device 515 is unable to inform the UE 510 that it is transmitting at too high a power, due to asymmetric nature of the communication (i.e. no downlink communication channel being available from the relay device 515 to the UE 510. Therefore, in this case, there is a need for the relay device 515 to be able to control the power of RACH transmissions transmitted from the UE 510 in a relay-assisted scenario when the UE is unable to access the core network via the eNodeB 520 direct.

Although the above example proposes the special group of RACH preambles 540 being transmitted at a maximum power level, the problem may still occur if the transmission of the special group of RACH preambles 540 is made at a level below the maximum transmit power of the previously transmitted RACH preambles 525, 530, 535.

Figure 6:
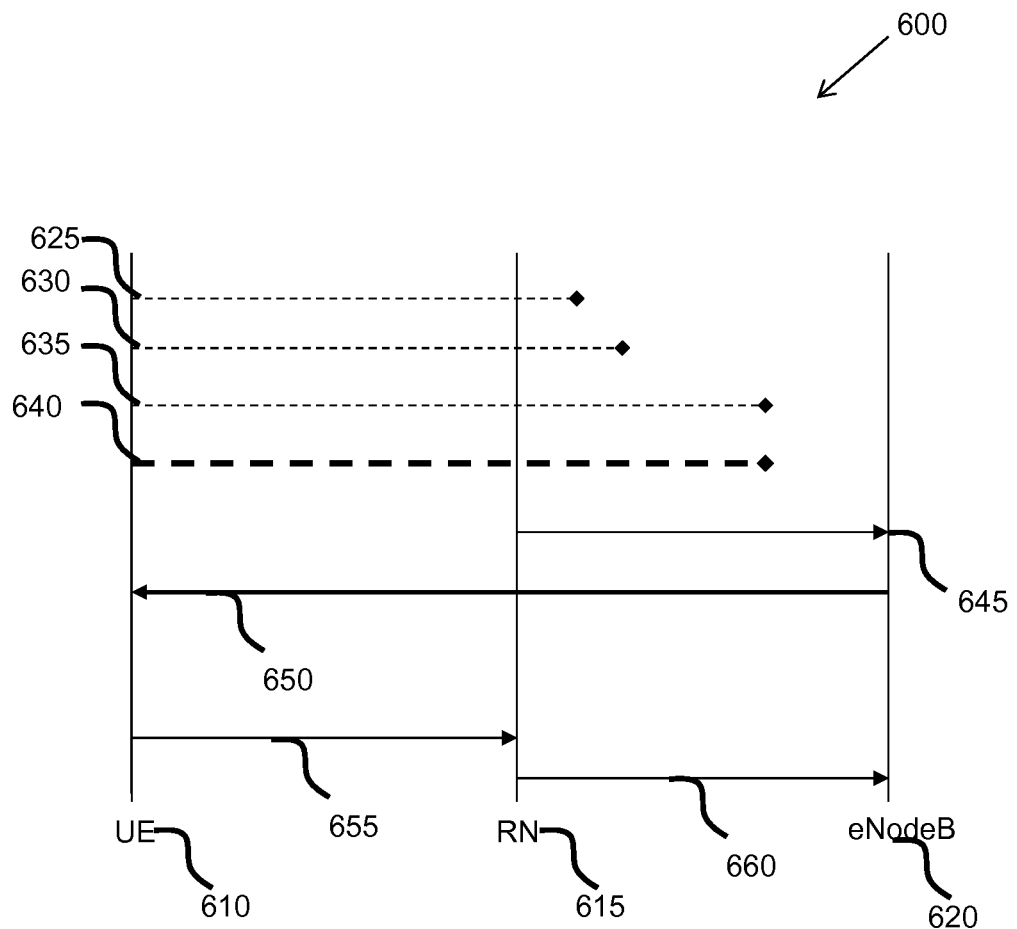
FIG. 6 illustrates an example of a simplified block diagram of a further modified random access preamble transmission, according to an example embodiment of the invention.

FIG. 6 illustrates an example simplified block diagram 600 of a further modified random access preamble transmission. The operation is similar to that discussed with respect to FIG. 5. Therefore, only the differences between the operation of FIG. 6 and FIG. 5 will be discussed below.

The example simplified block diagram 600 of FIG. 6 further comprises a message-3 transmission 655 from UE 610 to relay device 615 and a relayed message-3 transmission 660 sent from relay device 615 to eNodeB 620. Notably, in this example embodiment, the message-3 transmission comprises a radio resource control (RRC) connection request message. In this example embodiment, the message-3 transmission 655 is transmitted by the UE 610 at the required power to be 'acceptably' received at the relay device 615. This is due to the relay device 615 determining a required power offset, in this example embodiment a power delta, of the transmitted special group of RACH preambles 640.

In this example embodiment, the power delta relates to a difference between a desired maximum received power level of a transmission (such as a RACH transmission) from the UE 610 and an actual received power of the transmission from the UE 610. The relay device 615 determines this power offset from the received signal power of the transmitted special group of RACH preambles 640, as described in more detail later.

The relay device 615 then relays in transmission 645 at least an indication of the determined power delta, along with the implied information within the PRACH preamble. Thereafter, eNodeB 620 transmits a random access response 650 to the UE 610 that includes the power delta determined by the relay device 615.

The UE 610 receives the random access response 650 and determines therefrom the power delta requested by the intermediate relay device 615. In response thereto, the UE 610 (may) alter its transmit power based on the received power delta indication, so that the subsequent message-3 transmission is transmitted at the (reduced) power level of the special group of RACH preambles, taking into account the power delta.

In this manner, the relay device 615 receives the subsequent message-3 transmission at the required power level in order to be able to receive and decode it correctly, without, for example, saturating the relay device's receiver. The relay device 615 is then able to relay the message-3 to the eNodeB 620 in the desired manner.

Figure 8:
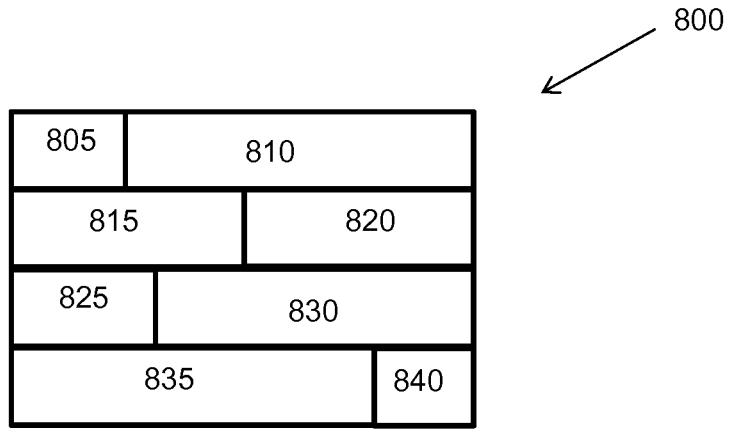
FIG. 8 illustrates an example of a simplified block diagram of a medium access control (MAC) element, according to an example embodiment of the invention.

In example embodiments, the special group of RACH preambles received at the relay device 615 are relayed in 660 to the eNodeB 620 in a medium access control (MAC) control element (as described, for example, with respect to FIG. 8).

Also in this example at this moment in time, the relay device 615 may determine a further required/desired power offset, which may also be relayed to the eNodeB 620 in the MAC control element. The eNodeB 620 may transmit a modified RAR (as described, for example, with respect to FIG. 9), which may also contain the calculated power delta determined by the relay device 615.

Figure 7:
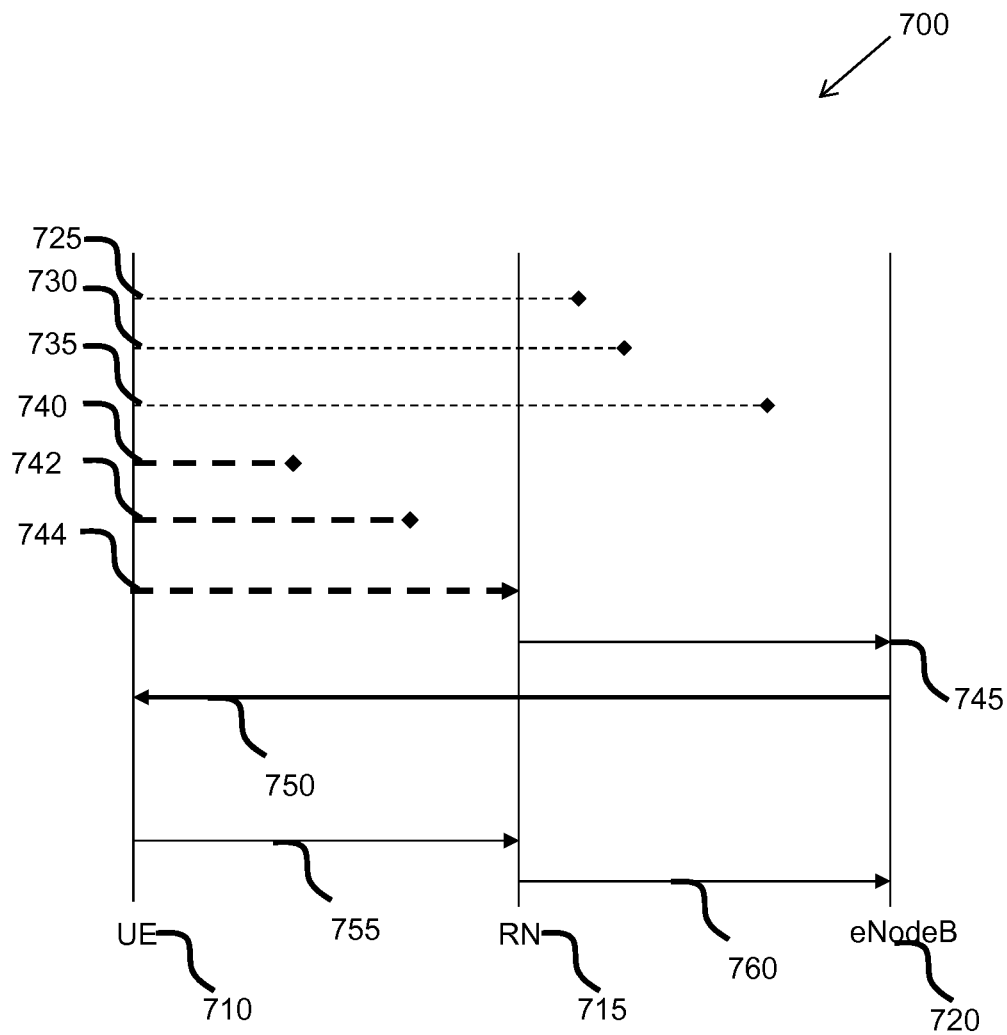
FIG. 7 illustrates an example of an alternative simplified block diagram of a modified random access preamble transmission, according to an example embodiment of the invention.

FIG. 7 illustrates an example of an alternative simplified block diagram 700 of a modified random access preamble transmission. In the previously described examples, it has been assumed that the UE continues to use maximum transmission power when it switches from the maximum ramped up power of, say the preamble transmission 735, to the power level to be used in transmitting the special group of RACH preambles 740. However, this process requires some form of closed loop control, wherein a power delta that identifies, for example, a difference between a desired power level and an actual power level received at the relay device 715, has to be relayed to the eNodeB 720 and subsequently transmitted to UE 710. However, in this illustrated example, once UE 710 has reached its maximum transmit power level for its group of RACH preambles 735, and determines that a special group of RACH preambles 740 needs to be transmitted, power ramping is employed with the special group of RACH preambles, rather than transmitting the special group at maximum power.

As shown in FIG. 7, power ramping 740, 742 of the special group is employed, until the relay device 715 successfully receives the special group 744. The relay device 715 then relays the special group of RACH preambles to eNodeB 720, which subsequently transmits a random access response 750 to the UE 710. The UE 710 then uses the transmit power for the successfully received preamble 744 when subsequently transmitting message-3 in communication 755, and possibly also with a system information signalled offset (which is the conventional approach taken when no relay functionality is used). In this manner, it is possible to dispense with a use of the power offset determined by the relay device, as described in previous embodiments, thereby producing an open loop system 700.

In another example embodiment, power offset information, as determined by the relay device 715, is transmitted 745 with the successfully power ramped preamble information 744 to the eNodeB 720 as well as in the response 750 to the UE 710.

In some examples, the same power level may not be used, for example in cases where a power level margin may be implemented for communications to/from UE 710. In this manner, a power level may be set that is not so close to the minimum power level that supports successful reception and decoding of communications to/from the UE 710.

In some example embodiments, the number of power ramping steps may be pre-determined, dynamically adjusted according to the prevailing operational conditions or user defined, whereby the number of increments may be set from one step to n steps and/or the power level range may be set accordingly.

In the case of the example embodiments of FIG. 6, and optionally FIG. 7, a new MAC control element and format may be required in order to transmit the power offset information to the eNodeB 710 via the relay device 715, an example of which is illustrated in, and described with respect to, FIG. 8. Note that the new MAC control element may also be needed for the example of FIG. 5, albeit that in this case the power offset information would not be needed.

As illustrated in FIG. 8, the relayed preamble message 800 may comprise a reserved part (R) 805, a timing advance part (TA command) 810, 815, a random access preamble ID part (RAPID) 820, 825, a power offset (e.g. power control information) 830, a Random Access Temporary Identifier (RA-RNTI) 835 and optional padding (PAD) 840, which may be used to pad the message to the required size. A MAC header in the Random Access Response on the PDSCH may comprise one or more from a group of: a random access preamble identifier that identifies the random access preamble received at eNodeB, a further temporary identifier (C-RNTI) for identifying the terminal device, a grant of uplink resources on the PUSCH, and a timing advance command for adjusting transmission times at the UE in dependence on the distance between the UE and the NodeB.

Figure 9:
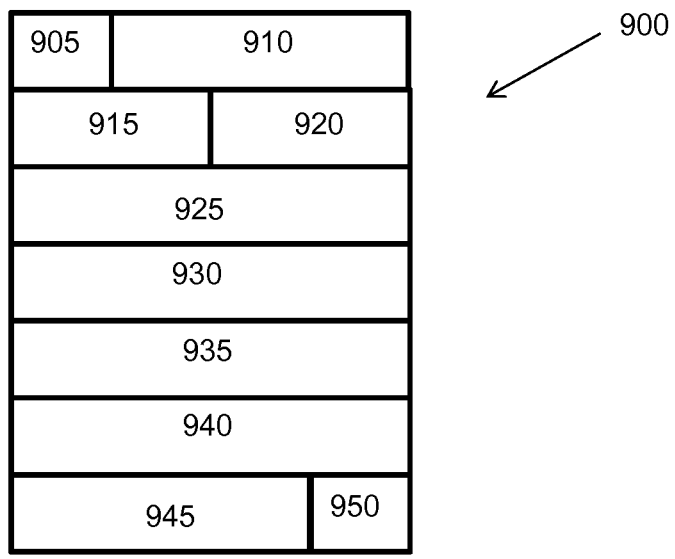
FIG. 9 illustrates an example of a simplified block diagram of a random access response (RAR) element, according to an example embodiment of the invention.

As well as a new MAC control element, a modified RAR may also be used, an example of which is illustrated in, and described with respect to, FIG. 9. A modified RAR message 900 is schematically illustrated in FIG. 9. In particular, the modified RAR message 900 comprises a reserved part (R) 905, a timing advance part (TA command) 910, 915, an allocation of uplink time and frequency resources (UL grant) 920, 925, 930, the further temporary identifier (C-RNTI) 935, 940, a power delta (Power control information) 945 and optional padding (PAD) 950.

Calculating Power Offset

One example of a calculation of the aforementioned power offset is now described. The power offset, which in this example embodiment is a power delta, is based on a reception power level of the RACH transmission from a UE to a corresponding relay device. This value is then compared with a pre-defined maximum receive power level that the relay device is able to receive without saturating its receiver.

Currently, in the known art, a dedicated UE control element is contained in the 20-bit uplink (UL) grant information contained in a standard MAC RAR. However, this control element is usually only three bits in length and provides, in general, a control range of −6 to +8 dB. In example embodiments of the invention, it is envisaged that this control element may be too small to deal with change in power, due in part to the absence of path loss calculations. Thus, in some examples, a separate power delta comprised in a separate part of the modified MAC RAR (illustrated with respect to FIG. 8, 9) may be used with a larger range than currently defined in the art.

In the known art, the UE determines the pathloss to the eNodeB and modifies its preamble power based on this determination. In contrast, the relay device, in this example embodiment, is concerned with the receive power of the relevant RACH preamble. As discussed above, a problem may occur when a UE is unable to transmit a RACH preamble to a corresponding eNodeB, but is able to receive downlink information from the eNodeB. In this case, the UE generally transmits at full power, which, if relatively close to a relay device, can saturate the relay device's receiver. The relay device is unable to directly transmit to the UE to inform it of the issue, due to an asynchronous system being utilised in this example embodiment. Hence, in this example, the relay device is only/primarily interested in the receive power of the transmission from the UE. In this embodiment, the pre-defined power level that the relay device compares with the received power from the UE can be any value. However, in this example embodiment, the pre-defined power level is set at the expected power needed to decode the message 3 transmission. In other embodiments, the pre-determined power level can be dynamically changed during operation. In other embodiments, the pre-determined level may be fixed at some other value, such as a maximum power that the relay device can receive a RACH transmission from the UE.

In the known art, for both PUSCH and PUCCH, a form of both closed and open loop power control exists:

1. In the closed loop power control, the TPC commands are successively transmitted back to the UE from the eNode B. In one example, these are based on comparisons with a set (pre-determined) level that the eNodeB expects to receive from the UE. For example the previously mentioned 3-bit $\delta_{msg2}$ parameter used to control power in range −6 to +8 dB may be used as a form of TPC command (informing the UE to increase or decrease its TX power by, say, a relatively small amount). Typically, TPC commands would be accumulated.
2. The open loop power control for PUSCH/PUCCH may employ nominal target level reception parameters signalled by the node B, for example offsets based on the grant received (the modulation and coding scheme or the number of subcarriers) and notably the pathloss to the eNodeB.

One problem with such a known relay device-assisted architecture is that the pathloss from the UE to the RN cannot be measured or used. Thus, examples of the invention may remove the pathloss component and the nominal target level parameters from the set of open loop parameters and replace them with a direct definition of the power used for a message 3 transmission. In some examples, the TPC commands then act to change the power of the PUSCH as required.

Figure 10:
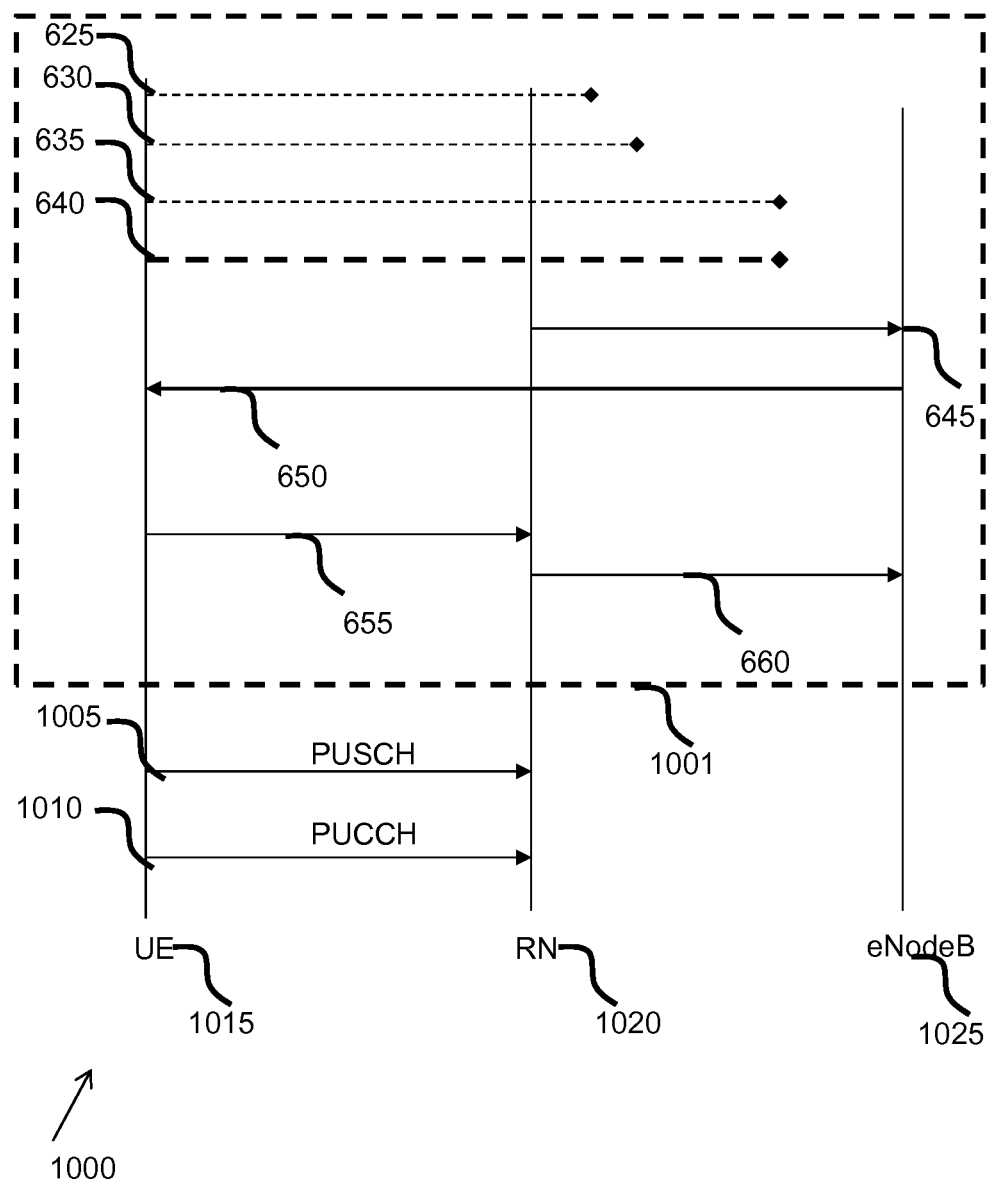
FIG. 10 illustrates an example of a modified block diagram of a modified random access preamble transmission, according to an example embodiment of the invention.

FIG. 10 illustrates a simplified message sequence chart 1000 of a modified random access preamble transmission, according to an example embodiment of the invention. The operation of FIG. 10, surrounded by the dashed box 1001, is similar to that described in previous example embodiments, specifically the example embodiment relating to FIG. 6. Therefore, only new features will be discussed hereafter. It should be noted that the operation of the example embodiment relating to FIG. 10 is not limited to the preceding messages described with reference to FIG. 6, and may equally be used with other example embodiments, singularly or in combination with other aspects of the invention.

Thus, FIG. 10 further illustrates subsequent communications between UE 1015, relay device 1020, and eNodeB 1025. In this example, the subsequent communications may comprise transmissions on a Physical Uplink Shared CHannel (PUSCH) 1005 and/or a Physical Uplink Control CHannel (PUCCH) 1010. In this example embodiment, both PUSCH and PUCCH signals are transmitted from the UE 1015 to the relay device 1020.

As discussed above, a problem may arise in scenarios when UE 1015 transmits at maximum power, as a receiver of the relay device 1020, if located close to the UE 1015, may saturate, as known in the art. To recap, in some example embodiments and as illustrated in FIG. 10, relay device 1020 determines a power offset from the received signal power of a transmitted special group of RACH preambles 640. The relay device 1020 is then operable to relay 645 the determined power delta with the special group of RACH preambles 640 to eNodeB 620. ENodeB 620 is then operable to transmit a random access response 650 that includes the power delta determined by the relay device 1020. The UE 1015 receives the random access response 650 and power delta, and alters its transmission power in response to the received power delta so that the subsequent message-3 transmission is transmitted at the power of the special group of RACH preambles including the power delta. Therefore the relay device 1020 receives the message-3 transmission at the required power to be able to receive it correctly, without saturating the relay device's receiver.

In this example embodiment, subsequent PUSCH 1005 and PUCCH 1010 transmissions utilise the power delta relayed in 650, thereby ensuring that subsequent transmissions will be received and may be correctly decoded by the relay device 1020. In this example embodiment, the transmission power of PUSCH 1005 and PUCCH 1010 is only based on the initial power of the message-3 transmission 655. In other example embodiments, the PUSCH 1005 and PUCCH 1010 transmission power may be further based on the contents of the MAC RAR message, as discussed above, rather than the power needed to obtain a successful RACH response.

Further example embodiments may base the power level of PUSCH 1005 and PUCCH 1010 transmissions based on a transmit power control (TPC) modification of the message-3 transmission 655 and/or open loop parameters based on the grant.

Further, in the PUCCH transmission 1010 case, other embodiments may additionally base the transmission power level on open loop common delta parameters based on the PUCCH 1010 format and the number of bits used to encode CQI/HARQ.

In essence, the PUCCH case is similar to that of the PUSCH case, in that the pathloss to the RN cannot be measured, and hence the use of a pathloss value plus a nominal received level at the eNodeB cannot be used. Thus, the power used for message 3 transmission plus accumulated TPC commands are relied upon, without any open loop pathloss determination or distribution.

Transmission of PUSCH and PUCCH

In order for UE 1015 to be able to set the transmission power of PUSCH 1005 and PUCCH 1010 accurately, based on at least message-3 transmission power, the behaviour of the UE 1015 needs to be modified from that known in the art.

In the below example, referring to a standard measurement defined in the art, setting the UE 1015 transmission power, $P_{PUSCH}$, for the physical uplink shared channel 1005 transmission in a subframe 'i' is defined by:—

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \text{ [dBm]}$$

In this example:

$P_{CMAX}$ is the configured UE transmitted power defined in 3GPP TS 36.101 and is basically the maximum power that the UE is allowed to transmit at—based on its power class.

$M_{PUSCH}(i)$ is the bandwidth of the PUSCH resource assignment expressed by the number of resource blocks valid for a subframe 'i'.

$P_{O\_PUSCH}(j)$ is a parameter composed of the sum of a cell specific nominal component $P_{O\_NOMINAL\_PUSCH}(j)$ provided from higher layers for j=0 and 1, and a UE specific component $P_{O\_UE\_PUSCH}(j)$ provided by higher layers for j=0 and 1.

$\alpha(j)$ is a parameter between '0' and '1' defined by higher layers. It is used as part of the fractional power control functionality. Typically, it would be set to '1' so that the pathloss is fully compensated and the fractional power control functionality is disabled.

PL is the path loss from the UE to the eNodeB;

$\Delta_{TF}$ is an offset function based on the MCS indicated in the grant in the associated PDCCH.

$f(i)$ is the closed loop element of the power control function. It is based on the TPC commands that are received back from the eNode B in downlink control information (formats 0 and 3/3A) included in the PDCCH (note that, as has been discussed above, there is also a TPC command element in the UL grant in the RAR also). TPC commands can either be accumulated or not (this option is configured using RRC signalling).

If accumulation is employed then: f(i) represents the accumulated TPC in the $i^{th}$ subframe and thus the value of f(i) is: f(i)=f(i−1)+δPUSCH(i−4). Where δPUSCH(i−4) is the TPC command received 4 frames ago. Note that this is 4 subframes ago due to the operation of the UL HARQ cycle in FDD.

If accumulation is not employed then f(i) is simply the absolute value of the last associated TPC command, due to the HARQ cycle in FDD this is 4 frames ago. Thus f(i)=δPUSCH (i−4).

For both types of f(*) (accumulation or current absolute) the first value is set as follows:

If $P_{O\_UE\_PUSCH}$ value is changed by higher layers, $f(0)=0$

Else $f(0) = \Delta P_{rampup} + \delta_{msg2}$ where $\delta_{msg2}$ is the TPC command indicated in the random access response, see 3GPP TS 36.213 section 6.2 that describes how the previously mentioned 3-bit parameter is mapped to the range −6 dB to +8 dB, and $\Delta P_{rampup}$ is provided by higher layers and corresponds to the total power ramp-up from the first to the last preamble.

In some example embodiments, PUSCH (re)transmissions may correspond to a semi-persistent grant, j=0.

In other example embodiments, PUSCH (re)transmissions may correspond to a dynamic scheduled grant, j=1.

In further example embodiments, PUSCH (re)transmissions may correspond to a random access response, j=2, for example:

$P_{O\_UE\_PUSCH}(2)=0$ and $P_{O\_NOMINAL\_PUSCH}(2)=P_{O\_PRE}+\Delta_{PREAMBLE\_Msg3}$, where the parameter PREAMBLE_INITIAL_RECEIVED_TARGET_POWER [8] ($P_{O\_PRE}$) and $\Delta_{PREAMBLE\_Msg3}$ are signalled from higher layers. For j=0 or 1, $\alpha \in \{0, 0.4, 0.5, 0.6, 0.7, 0.8, 0.9, 1\}$ is a 3-bit cell specific parameter provided by higher layers. For j=2, α(j)=1.

In the example embodiment of FIG. 10, the above known equation has been amended based on aspects of the claimed invention. UE 1015, using relay device 1020 as an intermediary communication network element, determines a PUSCH transmission power level for a message-3 transmission as:—

Ppusch=min($P_{cmax}$,transmission power of success preamble in max power group+10 log 10($M$PUSCH($i$))+$\Delta TF(i)$+delta defined in MAC RAR).

Where the delta defined in the MAC RAR is the (modified RAR MAC control element) power delta parameter 945 in FIG. 9.

In other example embodiments, UE 1015 using relay device 1020 determines PUSCH transmission power levels for non message-3 cases as:—

Ppusch($i$)=min($P_{CMAX}$,message 3 TX power+10 log 10($M$PUSCH($i$))+$\Delta TF(i)$+$f(i)$)

By utilising the above amended equations, it is possible to determine a transmit value for PUSCH based on a message-3 transmission. In this way, it can be assured that the subsequent PUSCH transmission can be received by the relay device 1020 without saturation of the relay device's receiver. Further, subsequent PUSCH transmissions are determined without a need for a path loss component.

In this example embodiment, in order to determine the correct PUCCH transmission power, the UE 1005 utilises the determined message-3 transmission power and baselines (sets the reference to) all future PUCCH transmissions to this message-3 transmission power.

In another example embodiment, all future PUCCH transmissions may be dynamically configured based, in part, on message-3 transmission power.

In the below example, referring to a standard measurement defined in the art, setting the UE 1015 transmission power, $P_{PUCCH}$ for the physical uplink control channel 1010 transmission in a subframe 'i' is defined by:—

$P_{PUCCH}(i)=\min\{P_{CMAX},P_{0\_PUCCH}PL+h(n_{CQI},n_{HARQ})+\Delta_{F\_PUCCH}(F)+g(i)\}$ [dBm]

In this example embodiment, $P_{CMAX}$ is the configured UE transmitted power defined in 3GPP TS 36.101, where:

PL is the UE measured path loss;

g(i) is the closed loop element of the power control function for PUCCH. It is similar to the case for PUSCH described above. The parameter is based on TPC commands received from the eNode B in downlink control information (formats 1A/1B/1D/1, 2A/2B/2 and 3/3A). Accumulation of TPC commands is mandatory for the PUCCH case. Thus, in the $i^{th}$ subframe g(i)=g(i−1)+δPUCCH(i−4). Where δPUCCH(i−4) is the TPC command received in the PDCCH 4 subframes ago. As for the PUSCH case the 4 frames are required to deal with the operation of the HARQ cycle.

The parameters $\Delta_{F\_PUCCH}(F)$ and $h(n_{CQI},n_{HARQ})$ are offset parameters based on the PUCCH format that is being used.

$P_{O\_PUCCH}$ is a parameter composed of the sum of a cell specific parameter $P_{O\_NOMINAL\_PUCCH}$ provided by higher layers and a UE specific component $P_{O\_UE\_PUCCH}$ provided by higher layers.

In the example embodiment of FIG. 10, the above known equation has been amended based on features of the claimed invention. UE 1015 using relay device 1020 determines PUCCH transmission power for message 3 as:—

$P$pusch($i$)=min($P_{CMAX}$,message 3 TX power+$h(n_{CQI},n_{HARQ})+\Delta_{F\_PUCCH}(F)+g(i)$)

In another example embodiment, the transmission power of PUCSH 1005 and PUCCH 1010 may be based on the value of message-3 transmissions determined using power ramping, as discussed in FIG. 7, thereby producing open loop control of the PUCSH 1005 and PUCCH 1010 signals.

In some example embodiments, the TPC command $\delta_{msg2}$ may be used for determining a power level for the special case of the PUSCH used to send a message 3 transmission (i.e. the first PUSCH transmission that the UE makes after a random access procedure), noting that a different TPC command structure is used for all other cases. The TPC command for a PUSCH used to send a message 3 transmission may be interpreted, say, according to the values in Table 1.

TABLE 1

| TPC Command $\delta_{msg2}$ for scheduled PUSCH | |
|---|---|
| TPC Command | Value (in dB) |
| 0 | −6 |
| 1 | −4 |
| 2 | −2 |
| 3 | 0 |
| 4 | 2 |
| 5 | 4 |
| 6 | 6 |
| 7 | 8 |

Referring back to FIG. 9, it is recognized that the performance range provided by known systems is not large enough to accommodate a new power delta control element. Therefore, as illustrated with respect to FIG. 9, a new MAC power delta control element 945 may be introduced as an additional field in the MAC RAR 900. In this example, the MAC power delta control element 945 may be used instead of $\delta_{msg2}$.

However, in some instances, the use of a MAC power delta control element 945 may require the structure of the MAC RAR 900 in FIG. 9 to be octet aligned. The addition of a power delta control element 945, thereby results in an additional field of at least 8 bits, for example using optional padding (PAD) bits 950.

In some examples, the power delta control element 945 may be used to control UE power with a granularity of 0.5 dB. In this case, power control of the UE could be effected over 128 dB (noting that an 8-bit field provides 256 values). However, in most telecommunications implementations, a typical range comprising 60 to 80 dB is employed. Therefore, in this example, some resource may be wasted, as more data could be transmitted than is actually used.

In some examples, therefore, the abovementioned MAC RAR 900, with additional power delta control element 945, may be deemed inefficient. In order to address this potential problem in some instances, the inventors have recognized that, in this example, the timing advance field 910, 915 may be too large for current uplink relaying scenarios. The typical timing advance field is an 11-bit timing advance field that allows timing of '0' to '20512' symbol periods. However, not all of the 11 bits are utilised. Generally, values from '0' to '1282' are signaled and each value may have a granularity of 16 symbol periods, which equates to 16*1282=20512 symbol periods. In LTE, this provides a timing advance of around 0.67 msec., which, in some examples, may support a communication cell radius of around 100 km (taking into consideration a round trip), which is excessive for most practical synchronous relay system scenarios. In an asynchronous (uplink only) relay system scenario, where relay nodes are located generally closer to the base stations, such granularity of the timing advance may be considered wasteful. Thus, in some examples, the timing advance part, in FIG. 9 illustrated as 910, 915, which typically comprise 11 bits, may provide some unused bits that are used to create a smaller power delta field.

In one example embodiment, the timing advance field may be reduced to 7 bits, thereby allowing signaling of '0' to '127' values, or '0' to '127'*16 (i.e. 2032) symbol periods. In this example, this may result in a maximum timing advance of 4 μs that is equivalent to a cell radius of around 600 m (taking into consideration a round trip). In most practical scenarios, this may be deemed sufficient for an uplink only relaying scenario. Therefore, in this example embodiment, the power delta field may be used instead of: $\delta_{msg2}$.

Figure 11:
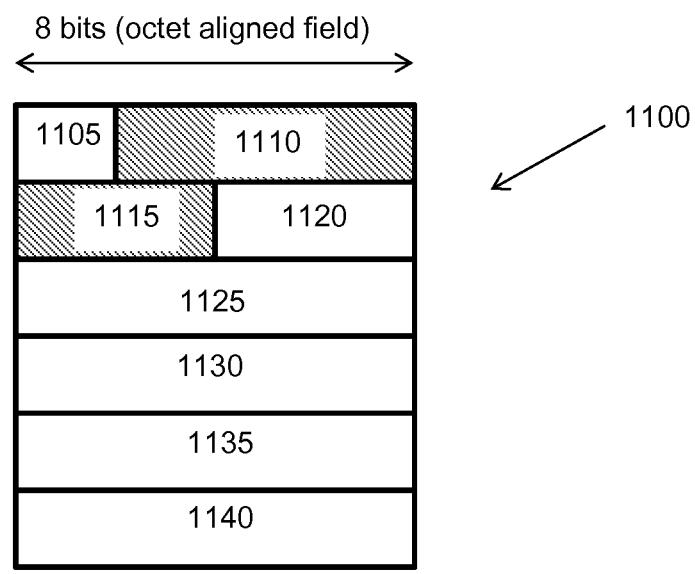
FIG. 11 illustrates an example of both a prior art and modified random access response RAR) element according to an example embodiment of the invention.
Figure 11:
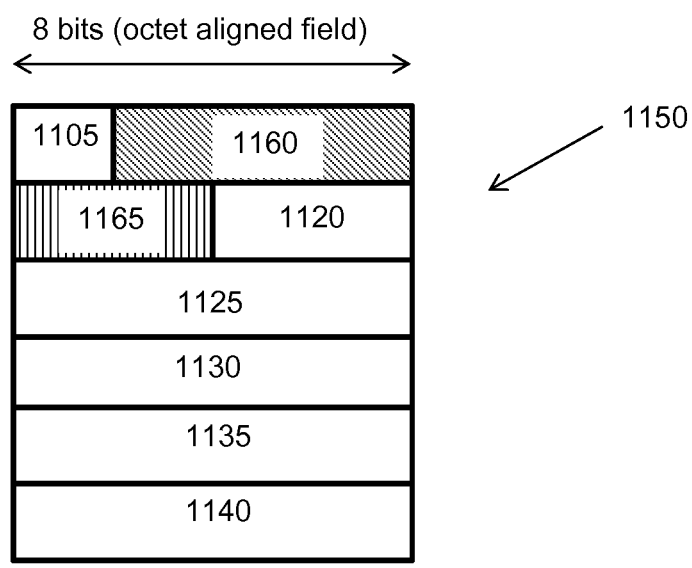

FIG. 11 illustrates an example of a prior art MAC RAR 1100, as generally defined in the art, shown in conjunction with a modified MAC RAR 1150, as per the abovementioned example. MAC RAR 1100 comprises a reserved part (field) 1105, a timing advance part 1110, 1115, which in this example comprises 11 bits, an uplink grant part 1120, 1125, 1130, which in this example comprises 20 bits, and a temporary C-RNTI part 1135, 1140, which in this example comprises 16 bits. The hatched region illustrates the timing advance part 1110, 1115.

Modified MAC RAR 1150 according to example embodiments of the invention comprises a number of similar elements/parts to known MAC RAR 1100. However, a primary difference provided by modified MAC RAR 1150, in this example, is in the shaded regions 1160 and 1165. In this example, timing advance part 1160 has been reduced to 7 bits, and a power delta part 1165 has been incorporated into (replacing) 4 bits of the prior art timing advance 1115. In other examples, the reserved part (field) 1105 may be used as part of the timing advance field, in order to make the timing advance up to 8 bits.

In examples, the UE and eNodeB may know when to utilise the modified MAC RAR 1150, due, in part, because the max power PRACH preamble group may have been utilised.

An example of utilising the power delta (4 bits) 1165 could be performed as illustrated in Table. 2 below. It should be noted that Table. 2 should not be seen as an exact interpretation of the 4 bits that may be specified for the power delta, and any alternative reasonable or perceived approach may be used, so long as in some instances relatively large negative offsets may be supported.

In this example, the power delta field 1165 replaces $\delta_{msg2}$.

TABLE 2

Power delta with simple 4 bit field

| Value of power offset field in RAR | Power offset (dB) |
|---|---|
| 0 | −70 |
| 1 | −65 |
| 2 | −60 |
| 3 | −55 |
| 4 | −50 |
| 5 | −45 |
| 6 | −40 |
| 7 | −35 |
| 8 | −30 |
| 9 | −25 |
| 10 | −20 |
| 11 | −15 |
| 12 | −10 |
| 13 | −5 |
| 14 | 0 |
| 15 | 5 |
| 16 | 10 |

In this example, even with a 4-bit power delta field, the granularity is of the order of 5 dB.

In other examples, it may be desirable to reduce the granularity in the abovementioned example. In some examples, it may be advantageous to utilise the information in $\delta_{msg2}$, and incorporate this with the information within the new power delta field 1165. This may allow the granularity to be reduced, without affecting the number of bits of the power delta 1165.

Figure 12:
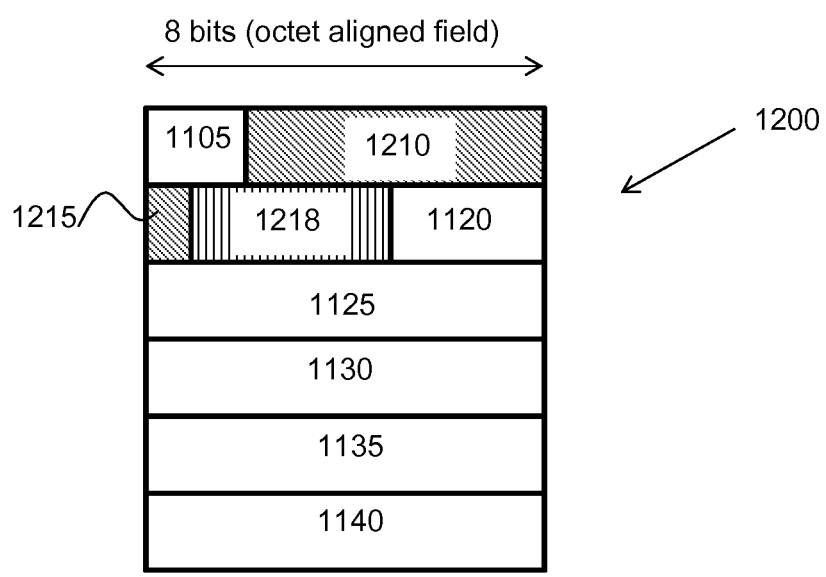
FIG. 12 illustrates a further example of a modified random access response RAR) element, according to an example embodiment of the invention.

FIG. 12 illustrates a further modified MAC RAR 1200 according to some examples of the invention. In this example, MAC RAR 1200 essentially comprises the same parts as MAC RAR 1100. A main difference being that the timing advance part 1210, 1215 may now comprise 8 bits. Further, the power delta part 1218 may comprise 3 bits. Again, in other examples, the reserved part (field) 1105 may be used as part of the timing advance field, in order to make the timing advance up to a 9-bit field.

In some examples, the range of $\delta_{msg2}$ is generally 14 dB (+8 dB to −6 dB, for example). If the new power delta 1218 comprised a step of 15 dB, as illustrated in Table 3, then it would be possible to use $\delta_{msg2}$ in addition to the new power delta 1218, in order to fill in between steps, for example where the new power delta 1218 provides a quick step to the additional finer granularity provided by $\delta_{msg2}$.

TABLE 3

Example of a bit implementation when power delta is used in conjunction with $\delta_{msg2}$.

| Value of power offset field in RAR | Power offset (dB) |
|---|---|
| 0 | −105 |
| 1 | −90 |
| 2 | −75 |
| 3 | −60 |
| 4 | −45 |
| 5 | −30 |
| 6 | −15 |
| 7 | 0 |

Table 3 illustrates an example of an implementation when new power delta 1218 is used in conjunction with $\delta_{msg2}$. For example, if a UE were to be instructed to reduce its power by 52 dB, the new power delta field 1218 may signal, say, −60 dB, and the $\delta_{msg2}$ may signal +8 dB, the combined effect being −52 dB. Therefore, in this example, only a 3-bit power delta 1218 is required. In the above example, an offset of +8 dB to −111 dB is possible, with a granularity of approximately 2 dB.

This may be interpreted in the same manner as currently specified in 3GPP TS36.213. Further, in this example, as only 3 bits may be used for the power delta 1218, an extra bit is available for use by the timing advance part 1210.

In one example, timing advance part 1210 may comprise 8 bits. In another example, timing advance part may comprise 9 bits, if, for example, the reserved part 1105 is utilised.

In this example, a timing advance part 1210 comprising, for example, 8 bits, may double the timing advance range, compared to FIG. 11. In this example, the maximum cell radius may be around 1.2 km, which is well above what is anticipated for the uplink only relaying case. In some examples, the number of timing advance bits being stolen may be determined as a function of the cell radius required to support useful communications with UEs, thereby avoiding any inefficiency/wastage of stolen timing advance bits.

In further examples, it may be advantageous to maintain the current MAC RAR 1100, as defined in the art, but alter a UE's interpretation of $\delta_{msg2}$ if it has sent its PRACH (special set) preamble using the max power group, for example. An example of a possible modification to the $\delta_{msg2}$ mapping is illustrated in table 4.

TABLE 4

TPC command $\delta_{msg\,2}$ for scheduled PUSCH when UE has used a new PRACH max preamble group.

| TPC Command | Value (in dB) |
|---|---|
| 0 | −50 |
| 1 | −40 |
| 2 | −30 |
| 3 | −20 |
| 4 | −10 |
| 5 | 0 |
| 6 | 5 |
| 7 | 10 |

Thus, as shown in some examples, it is possible to maintain the general format of the known MAC RAR 1100, whilst additionally providing various configurations of power control to a UE in a relay-assisted uplink scenario.

Figure 13:
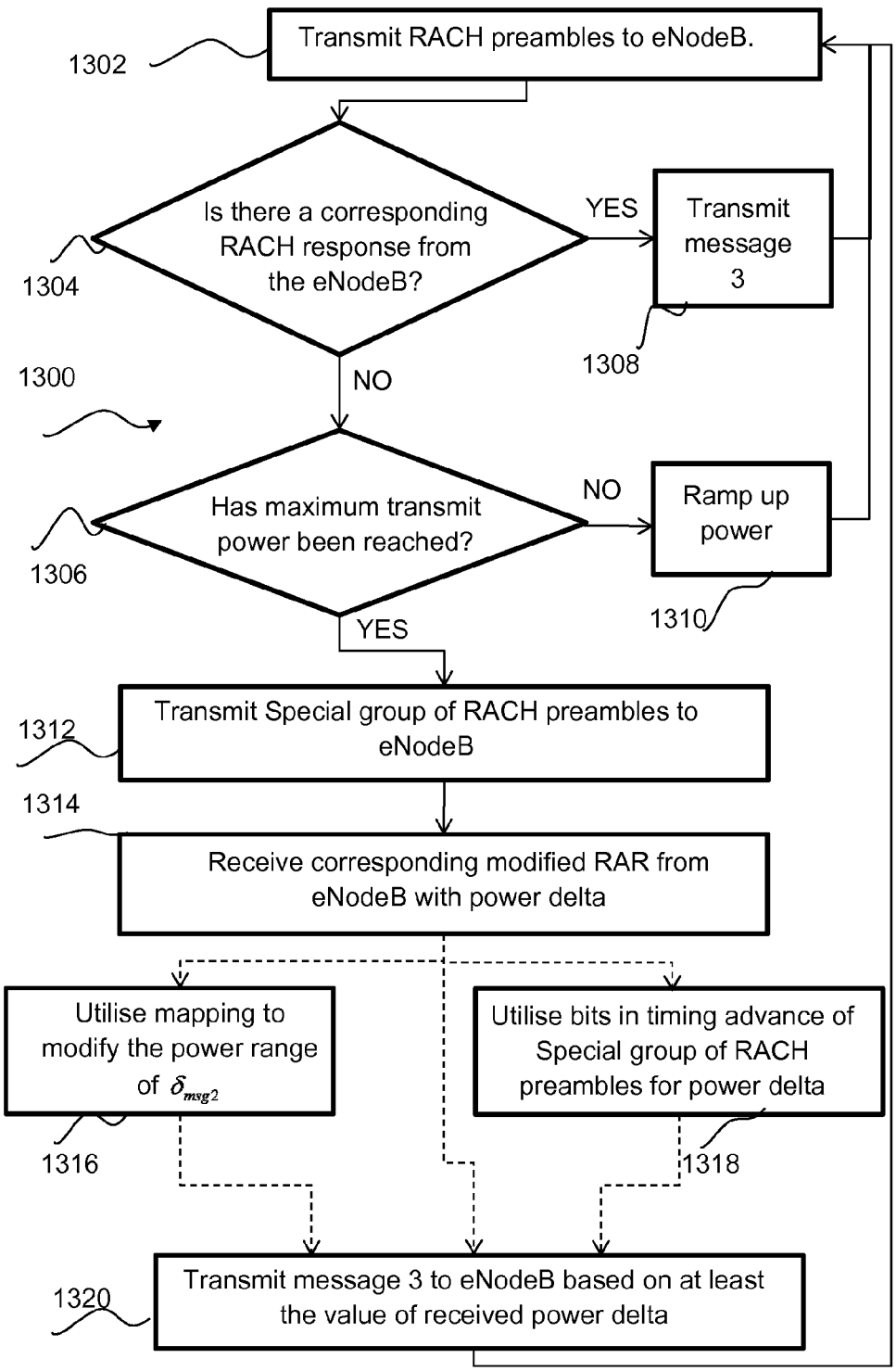
FIG. 13 illustrates a flow chart of a terminal device encompassing aspects of the invention.

FIG. 13 illustrates an example flow chart 1300 employed by a terminal device encompassing aspects of the invention. At 1302, the terminal device is operable to transmit RACH preambles to at least one eNodeB. At 1304, the terminal device determines whether a corresponding RACH response has been transmitted from at least one eNodeB. If the terminal device determines that a corresponding RACH response has been transmitted from at least one eNodeB in 1304, the terminal device transmits a message 3 transmission at 1308. If the terminal device determines that a corresponding RACH response has not been transmitted from at least on eNodeB in 1304, the terminal device determines, at 1306, whether it has reached its maximum transmit power. If the terminal device determines that it has not reached its maximum transmit power in 1306, the terminal device ramps up its transmitter power at 1310 and returns to 1302. If the terminal device determines that it has reached its maximum transmit power in 1306, the terminal device may transmit a 'special group of RACH preambles' to the at least one eNodeB via a relay device at 1312, as described previously.

The terminal device may then receive a corresponding modified RAR from the at least one eNodeB with a power delta value, at 1314. In response to this received modified RAR, the terminal device may transmit a message 3 to the corresponding at least one eNodeB based on at least the value of the received power delta in 1320, as instructed by the at least one eNodeB. In some examples, the at least one eNodeB may (or may not) include one or more of the aforementioned options of mapping the $\delta_{msg2}$ power range in 1316 or a stealing timing advance bits of 1318. As the terminal device (UE) knows that its communication us being relayed, following transmission of the special set of preambles and a receipt of a corresponding modified RAR in response thereto, the terminal device (UE) knows the format of the modified RAR and, thus, knows how to decode it correctly to determine the instructions.

For example, the terminal device may, as instructed by the at least one eNodeB, utilise mapping at 1316 to modify the power range of $\delta_{msg2}$, where the mapping may be utilised in response to the terminal device recognizing that a relay device is being used in the communication by receiving a response to the 'special group of RACH preambles. In this example, the at least one eNodeB may also recognize that a relay device is being used in the communication by receiving the 'special group of RACH preambles and in one example be notified of the terminal device's intention to utilise a modified power range of $\delta_{msg2}$. The terminal device may then proceed to transmit message 3 to the at least one eNodeB based on at least the value of the received power delta.

In another example, the eNodeB may also inform/instruct the terminal device to recover/decode the, received power delta value from replaced timing advance bits in the message 3 transmission (with or without initializing the mapping option of 1316). Advantageously, the stealing of timing advance bits without having to introduce a new layer to the message 3 protocol stack, increases an efficiency of the transmitted protocol stack. In a further example, the terminal device may utilise both of 1316 and 1318 before transmitting in 1320 a message-3 to the base station (eNodeB) based on at least the value of the received power delta.

Figure 14:
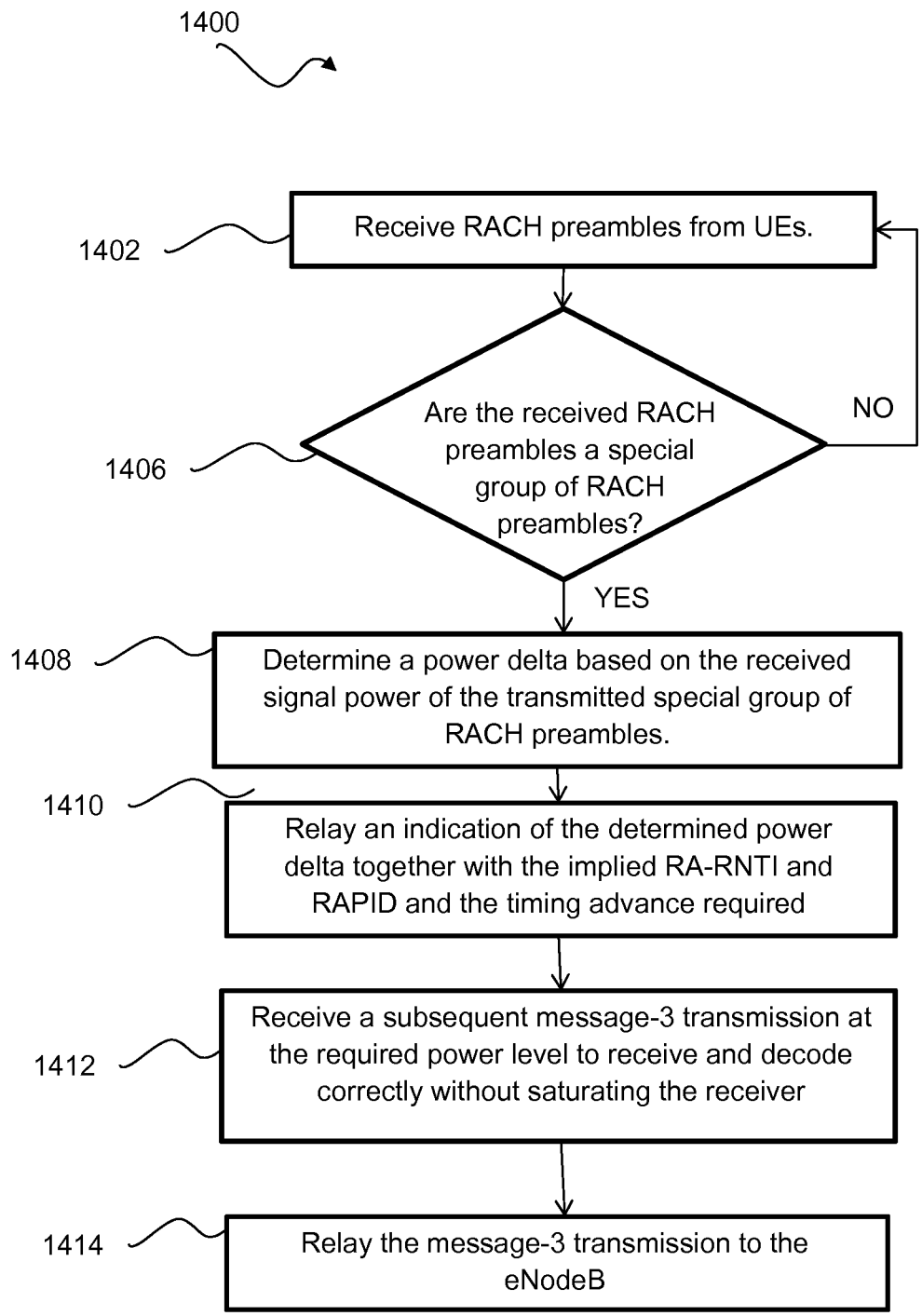
FIG. 14 illustrates a flow chart of a relay device encompassing aspects of the invention.

Referring now to FIG. 14, there is illustrated a flow chart 1400 of an operation of a relay device encompassing aspects of the invention. At 1402, the relay device is operable to receive RACH preambles transmitted from at least one UE. If the relay device determines, at 1406, that the received RACH preambles are a 'special group of RACH preambles', the relay device continues to 1408; otherwise the relay device returns to 1402.

At 1408, the relay device may determine a power delta based on, at least, the received power of the transmitted 'special group of RACH preambles'. In an example embodiment, the received power of the transmitted 'special group of RACH preambles' may be further compared with a desired power level. At 1410, the relay device relays, at least, an indication of the determined power delta together with the implied information associated with a reception of the 'special group of RACH preambles' (RAPID, RA-RNTI and timing advance command, as illustrated in FIG. 8) to the eNodeB. At this point, the eNodeB may be operable to transmit a random access response that may include the power delta determined by the relay device. At 1412, the relay device is operable to receive a subsequent message-3 transmission from the UE at the required power level to enable the relay device to receive and decode the message-3 transmission correctly without saturating the relay device's receiver. At 1414, the relay device is operable to relay the message-3 transmission to the eNodeB and the process ends.

Figure 15:
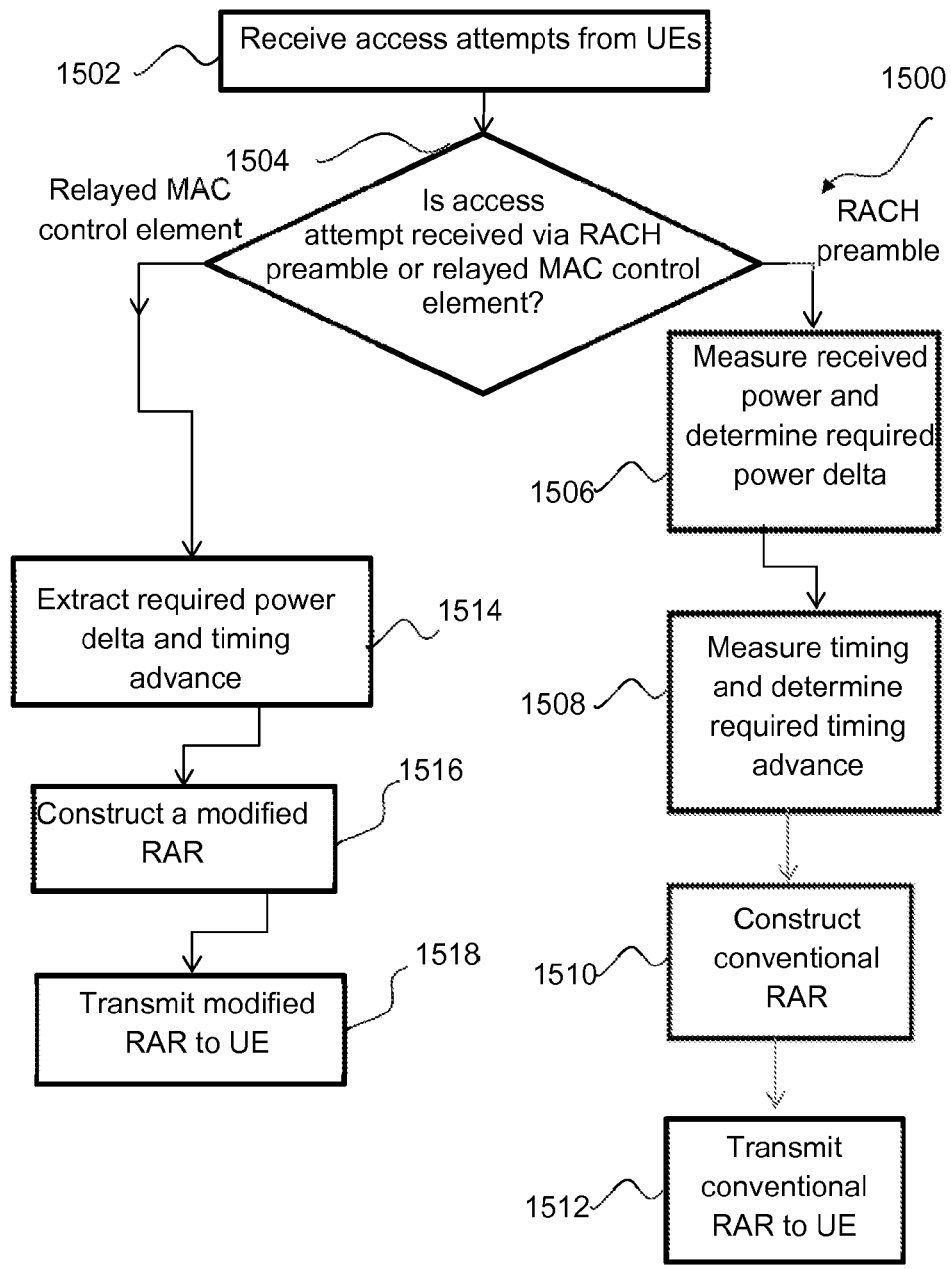
FIG. 15 illustrates a flow chart of a base station, such as an eNodeB, encompassing aspects of the invention.

FIG. 15 illustrates a flow chart of an operation of a base station encompassing aspects of the invention. At 1502, the base station receives access attempts from at least one terminal device. At 1504, the base station determines whether (or not) the received RACH preambles are conventional RACH preambles or via a relayed MAC control element. If the received RACH preambles are conventional RACH preambles, in which case the base station measures the received power and determines a required power delta at 1506 and measures a timing of the UE transmission and determines a required timing advance at 1508. The base station then constructs a conventional RAR at 1510 and transmits the conventional RAR at 1512 to the corresponding at least one terminal device. Note that the base station (eNodeB) doesn't need the large power deltas needed for the relay case as the UE has been able to work out a pathloss to the base station (eNodeB) and power control itself appropriately, due to the beacon.

If the base station (eNodeB) determines that the access attempt was via the special group of RACH preambles comprising a relayed MAC control element, in 1504, i.e. indicative of a relay device uplink, the base station (eNodeB) extracts the required delta and timing advance in 1514. The base station (eNodeB) then constructs a modified RAR in 1516 and transmits the modified RAR to the corresponding at least one terminal device (UE) with a corresponding power delta calculated by at least one relay device, at step 1518.

Figure 16:
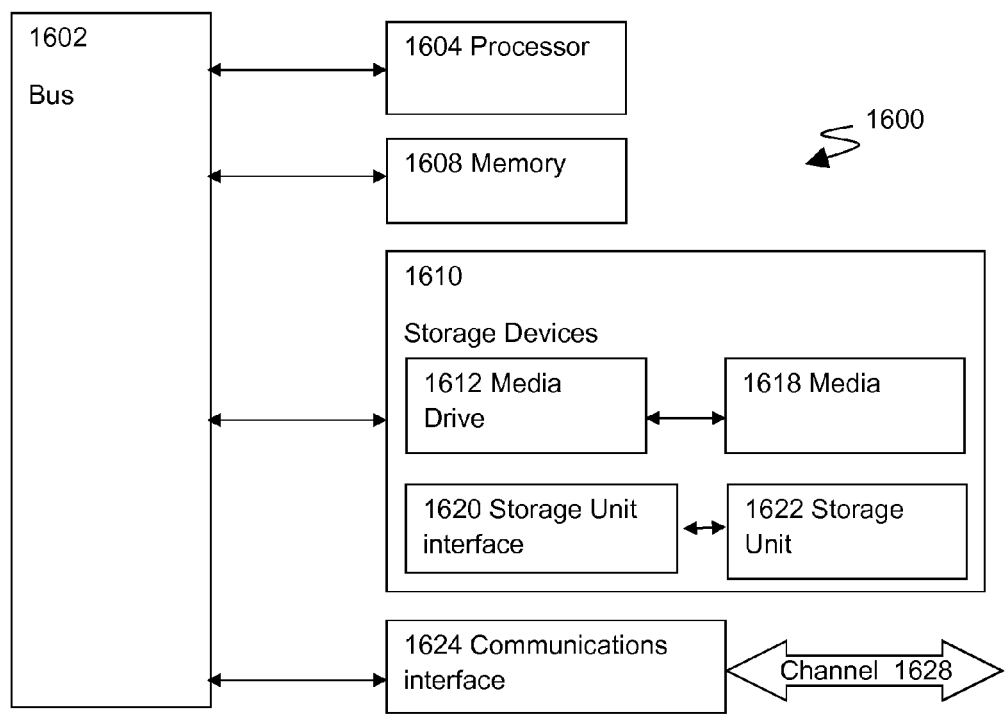
FIG. 16 illustrates a simple example of a typical computing system that may be employed to implement signal processing functionality in embodiments of the invention

Referring now to FIG. 16, there is illustrated a typical computing system 1600 that may be employed to implement software-controlled power control functionality in embodiments of the invention that utilize an intermediary relay device between a terminal device, such as a UE, and a base station, such as an eNodeB. Computing systems of this type may be used in wireless communication units, such as first or second wireless network elements. Those skilled in the relevant art will also recognize how to implement the invention using other computer systems or architectures. Computing system 1600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1600 can include one or more processors, such as a processor 1604. Processor 1604 can be implemented using a general or special-purpose processing engine such as, for example, a microprocessor, microcontroller or other control logic. In this example, processor 1604 is connected to a bus 1602 or other communications medium.

Computing system 1600 can also include a main memory 1608, such as random access memory (RAM) or other dynamic memory, for storing information and instructions to be executed by processor 1604. Main memory 1608 also may be used for storing temporary variables or other intermediate information during execution of instructions to be executed by processor 1604. Computing system 1600 may likewise include a read only memory (ROM) or other static storage device coupled to bus 1602 for storing static information and instructions for processor 1604.

The computing system 1600 may also include information storage system 1610, which may include, for example, a media drive 1612 and a removable storage interface 1620. The media drive 1612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1618 may include, for example, a hard disk, floppy disk, magnetic tape, optical disk, CD or DVD, or other fixed or removable medium that is read by and written to by media drive 1612. As these examples illustrate, the storage media 1618 may include a computer-readable storage medium having particular computer software or data stored therein.

In alternative embodiments, information storage system 1610 may include other similar components for allowing computer programs or other instructions or data to be loaded into computing system 1600. Such components may include, for example, a removable storage unit 1622 and an interface 1620, such as a program cartridge and cartridge interface, a removable memory (for example, a flash memory or other removable memory module) and memory slot, and other removable storage units 1622 and interfaces 1620 that allow software and data to be transferred from the removable storage unit 1618 to computing system 1600.

Computing system 1600 can also include a communications interface 1624. Communications interface 1624 can be used to allow software and data to be transferred between computing system 1600 and external devices. Examples of communications interface 1624 can include a modem, a network interface (such as an Ethernet or other NIC card), a communications port (such as for example, a universal serial bus (USB) port), a PCMCIA slot and card, etc. Software and data transferred via communications interface 1624 are in the form of signals which can be electronic, electromagnetic, and optical or other signals capable of being received by communications interface 1624. These signals are provided to communications interface 1624 via a channel 1628. This channel 1628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 1608, storage device 1618, or storage unit 1622. These and other forms of computer-readable media may store one or more instructions for use by processor 1604, to cause the processor to perform specified operations. Such instructions, generally referred to as 'computer program code' (which may be grouped in the form of computer programs or other groupings), when executed, enable the computing system 1600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1600 using, for example, removable storage drive 1622, drive 1612 or communications interface 1624. The control logic (in this example, software instructions or computer program code), when executed by the processor 1604, causes the processor 1604 to perform the functions of the invention as described herein.

In one example, a tangible non-transitory computer program product comprises executable program code operable for, when executed at a terminal device arranged to communicate with a base station via a relay device in a wireless communications system, performing the following steps: transmitting an access request message to the base station wherein the access request message comprises one from a set of access preambles that indicate relay device uplink assistance is required; receiving an access request grant response from the base station; processing the access request grant response and extract therefrom transmit power control information for transmissions to the relay device; mapping a first power level indicated in the transmit power control information to a second power level associated with a transmission via the relay device; and generating and transmitting a transmission to the relay device at the mapped transmit second power level.

In one example, a tangible non-transitory computer program product comprises executable program code operable for, when executed at a base station arranged to communicate with a terminal device on an uplink channel via a relay device in a wireless communications system, performing the steps comprising: receiving an access request message from the terminal device; processing the access request message; extracting a relayed control element that indicates relay device uplink assistance was used wherein the relayed control element comprises a power delta from the relay device; and constructing and transmitting an access request grant response to the terminal device comprising a mapped transmit power value to be applied by the terminal device in relayed communications.

It will be appreciated that, for clarity purposes, the above description has described embodiments of the invention with reference to different functional units and processors. However, it will be apparent that any suitable distribution of functionality between different functional units or processors, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. One example of the integrated circuit that is suitable for a network element, such as a relay device for providing intermediary communications between a wireless communication unit and an eNodeB, is the relay device control processor.

The integrated circuit for a terminal device arranged to communicate with a base station via a relay device in a wireless communications system. The integrated circuit comprises: a control processor arranged to: transmit an access request message to the base station wherein the access request message comprises one from a set of access preambles that indicate relay device uplink assistance is required; receive an access request grant response from the base station; process the access request grant response and extract therefrom transmit power control information for transmissions to the relay device; map a first power level indicated in the transmit power control information to a second power level associated with a transmission via the relay device; and generate and transmit a transmission to the relay device at the mapped transmit second power level.

One example of a further integrated circuit that is suitable for a base station arranged to communicate with a terminal device on an uplink channel via a relay device in a wireless communications system, where the integrated circuit comprises a control processor arranged to: receive an access request message from the terminal device; process the access request message; extract a relayed control element that indicates relay device uplink assistance was used wherein the relayed control element comprises a power delta from the relay device; and construct and transmit an access request grant response to the terminal device comprising a mapped transmit power value to be applied by the terminal device in relayed communications.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity, the signal processing module of the first network element has been illustrated and described as a single processing module, whereas in other implementations it may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A terminal device arranged to communicate with a base station via a relay device in a wireless communications system, the terminal device comprising:
   a transmitter arranged to transmit an access request message to the base station wherein the access request message comprises one from a set of access preambles that indicate relay device uplink assistance is required;
   a receiver arranged to receive an access request grant response from the base station; and a control processor operably coupled to the transmitter and
  receiver and arranged to:
  process the access request grant response;
  extract transmit power control information therefrom
    for transmissions to the relay device;
  map a first power level indicated in the transmit power
    control information to a second power level associated with a transmission via the relay device; and
  generate and transmit a transmission to the relay device
    at the mapped transmit second power level.

2. The terminal device of claim 1 wherein the transmitter is arranged to first transmit an access request message to the base station a number of times at an increasing power level; and transmit, upon failure to receive a response to said access request messages, the access request message that comprises one from a set of access preambles that indicate relay device uplink assistance is required to the base station.

3. The terminal device of claim 1 wherein the control processor is arranged to generate and transmit a message-3 transmission to the relay device at the mapped transmit second power level.

4. The terminal device of claim 1 wherein the extracted transmit power control (TPC) information comprises a $\delta_{msg2}$ TPC command indicated in a random access response.

5. The terminal device of claim 4 wherein the $\delta_{msg2}$ command is received in a random access response and mapped to a modified $\delta_{msg2}$ command that is indicative of a message that is to be relayed via the relay device.

6. The terminal device of claim 4 wherein the $\delta_{msg2}$ command is received in a random access response and replaced with a new $\delta_{msg2}$ command that is indicative of a message that is to be relayed via the relay device.

7. The terminal device of claim 4 wherein the control processor receives the access request grant response comprising a power delta value and an uplink grant comprising the $\delta_{msg2}$ command.

8. The terminal device of claim 1 wherein a power level of the transmission to the relay device at the mapped transmit second power level is not based on a determination of pathloss between the relay device and the terminal device.

9. An integrated circuit for a terminal device arranged to communicate with a base station via a relay device in a wireless communications system, the integrated circuit comprising:
  a control processor arranged to:
    transmit an access request message to the base station wherein the access request message comprises one from a set of access preambles that indicate relay device uplink assistance is required;
    receive an access request grant response from the base station;
    process the access request grant response and extract therefrom transmit power control information for transmissions to the relay device;
    map a first power level indicated in the transmit power control information to a second power level associated with a transmission via the relay device; and
    generate and transmit a transmission to the relay device at the mapped transmit second power level.

10. A method for a terminal device arranged to communicate with a base station via a relay device in a wireless communications system, the method comprising:
  transmitting an access request message to the base station wherein the access request message comprises one from a set of access preambles that indicate relay device uplink assistance is required;
  receiving an access request grant response from the base station;
  processing the access request grant response and extract therefrom transmit power control information for transmissions to the relay device;
  mapping a first power level indicated in the transmit power control information to a second power level associated with a transmission via the relay device; and
  generating and transmitting a transmission to the relay device at the mapped transmit second power level.

11. A non-transitory computer program product comprising executable program code to wirelessly communicate data from a terminal device to a base station via a relay device, the executable program code operable for, when executed at the terminal device, performing the method of claim 10.

12. A wireless communication system comprising:
  at least one terminal device;
  at least one base station; and
  at least one relay device for supporting communications between the at least one terminal device and the at least one base station,
wherein the at least one terminal device comprises:
  a transmitter arranged to transmit an access request message to the base station wherein the access request message comprises one from a set of access preambles that indicate relay device uplink assistance is required;
  a receiver arranged to receive an access request grant response from the base station; and
  a control processor operably coupled to the transmitter and receiver and arranged to:
    process the access request grant response;
    extract transmit power control information therefrom for transmissions to the relay device;
    map a first power level indicated in the transmit power control information to a second power level associated with a transmission via the relay device; and
    generate and transmit a transmission to the relay device at the mapped transmit second power level.

13. A base station arranged to communicate with a terminal device on an uplink channel via a relay device in a wireless communications system, the base station comprising:
  a receiver arranged to receive an access request message from the terminal device; and
  a control processor operably coupled to the receiver and arranged to:
    process the access request message;
    extract a relayed control element that indicates relay device uplink assistance was used wherein the relayed control element comprises a power delta from the relay device; and
    construct and transmit an access request grant response to the terminal device comprising a mapped transmit power value to be applied by the terminal device in relayed communications.

14. The base station of claim 13 wherein the receiver and control processor are further arranged to receive an access request message from the terminal device direct and construct and transmit an access request grant response to the terminal device comprising a transmit power value to be applied by the terminal device in direct communications; and revert to construct and transmit an access request grant response to the terminal device comprising a mapped transmit power value to be applied by the terminal device in relayed communications upon receiving the access request message that comprises one from a set of access preambles that indicate relay device uplink assistance is required to the base station.

15. The base station of claim 13 wherein the mapped transmit power value comprises a $\delta_{msg2}$ TPC command indicated in a random access response.

16. The base station of claim 13 wherein the control processor constructs and transmits the access request grant response comprising a power delta value and an uplink grant comprising the $\delta_{msg2}$ command.

17. An integrated circuit for a base station arranged to communicate with a terminal device on an uplink channel via a relay device in a wireless communications system, the integrated circuit comprising:
a control processor arranged to:
receive an access request message from the terminal device;
process the first access request message;
extract a relayed control element that indicates relay device uplink assistance was used wherein the relayed control element comprises a power delta from the relay device; and
construct and transmit an access request grant response to the terminal device comprising a mapped transmit power value to be applied by the terminal device in relayed communications.

18. A method for a base station arranged to communicate with a terminal device on an uplink channel via a relay device in a wireless communications system, the method comprising:
receiving an access request message from the terminal device;
processing the access request message;
extracting a relayed control element that indicates relay device uplink assistance was used wherein the relayed control element comprises a power delta from the relay device; and
constructing and transmitting an access request grant response to the terminal device comprising a mapped transmit power value to be applied by the terminal device in relayed communications.

19. A non-transitory computer program product comprising executable program code to wirelessly communicate data from a terminal device to a base station via a relay device, the executable program code operable for, when executed at the base station, performing the method of claim 18.

* * * * *